US012395567B2

(12) United States Patent
Cody et al.

(10) Patent No.: US 12,395,567 B2
(45) Date of Patent: *Aug. 19, 2025

(54) CONTINUOUS SCANNING ENGINE WITH AUTOMATIC PROTOCOL DETECTION

(71) Applicant: Censys, Inc., Ann Arbor, MI (US)

(72) Inventors: Jeff Cody, Huntertown, IN (US); David Adrian, Denver, CO (US); J. Alex Halderman, Ann Arbor, MI (US); Paul A Parkanzky, Ann Arbor, MI (US)

(73) Assignee: Censys, Inc., Ann Arbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/408,432

(22) Filed: Jan. 9, 2024

(65) Prior Publication Data
US 2024/0146818 A1 May 2, 2024

Related U.S. Application Data

(63) Continuation of application No. 17/515,121, filed on Oct. 29, 2021, now Pat. No. 11,936,748.

(51) Int. Cl.
H04L 67/51 (2022.01)
H04L 43/18 (2022.01)
H04L 69/12 (2022.01)

(52) U.S. Cl.
CPC .............. *H04L 67/51* (2022.05); *H04L 43/18* (2013.01); *H04L 69/12* (2013.01)

(58) Field of Classification Search
CPC ......... H04L 67/51; H04L 43/18; H04L 69/12; H04L 41/12; H04L 43/10
See application file for complete search history.

(56) References Cited

U.S. PATENT DOCUMENTS 8,621,060 B2   12/2013   McClure et al.
8,661,126 B2   2/2014    Cole et al.
(Continued)

OTHER PUBLICATIONS

Nmap (Nmap Network Scanning, Jan. 16, 2020, https://web.archive.org/web/20200116064736/https://nmap.org/book/vscan.html#ex-version-detection-scan1, retrieved Feb. 3, 2025). (Year: 2020).*
Jan, Ruth, et al., "Large-Scale Scanning of TCP's Initial Window", Proceedings of the 2017 Internet Measurement Conference, 2017, pp. 1-7.
(Continued)

*Primary Examiner* — Abdulkader M Alriyashi
(74) *Attorney, Agent, or Firm* — Robert C. Kowert; Kowert, Hood, Munyon, Rankin & Goetzel, P.C.

(57) ABSTRACT

Various embodiments of apparatuses and methods for a continuous scanning engine with automatic protocol detection are described. In some embodiments, the continuous scanning engine comprises one or more discovery components and one or more protocol detection components. The discovery components, in some embodiments, send initial packets to a plurality of ports of a plurality of network addresses of a network, receive responses to a least some of the initial packets, asynchronously match the received responses to the sent initial packets, and determine that some ports at some network addresses require further analysis. The protocol inspection components, in some embodiments, attempt to communicate with the ports at the network addresses using a plurality of communication protocols, determine that an attempted communication protocols results in a successful communication, and provides the port, the network address, and the attempted communication protocol that resulted in the successful communication to a database.

19 Claims, 13 Drawing Sheets

(56) References Cited

U.S. PATENT DOCUMENTS

| | | | |
|---|---|---|---|
| 10,630,674 B2 | 4/2020 | Bell et al. | |
| 10,721,270 B2 | 7/2020 | Reddy et al. | |
| 11,768,889 B1 * | 9/2023 | Smith | G06F 16/955 |
| | | | 707/706 |
| 11,936,748 B1 | 3/2024 | Cody et al. | |
| 2003/0161313 A1 | 8/2003 | Jinmei | |
| 2003/0212779 A1 | 11/2003 | Boyter et al. | |
| 2004/0246958 A1 | 12/2004 | Lee | |
| 2008/0183889 A1 * | 7/2008 | Andreev | H04L 67/02 |
| | | | 709/238 |
| 2010/0138906 A1 | 6/2010 | Iwai et al. | |
| 2017/0310699 A1 | 10/2017 | Gilbert et al. | |
| 2020/0183744 A1 * | 6/2020 | Kim | H04L 67/1008 |
| 2020/0204451 A1 | 6/2020 | Marchese | |
| 2023/0135240 A1 | 5/2023 | Cody et al. | |

OTHER PUBLICATIONS

Gerry Wan, et al., "On the Origin of Scanning: The Impact of Location on Internet-Wide Scans", Proceedings of the ACM Internet Measurement Conference, 2020, pp. 1-18.

Zakir Durumeric, et al., "ZMap: Fast Internet-Wide Scanning and its Security Applications", In the Proceedings of the 22nd USENIX Security Symposium, Aug. 2013, pp. 1-15.

Shehar Bano, et al., "Scanning the Internet for Liveness", ACM SIGCOMM Computer Communication Review, vol. 48, Issue 2, Apr. 2018, pp. 1-7.

David Adrian Zakir, et al., "Zippier ZMap: Internet-Wide Scanning at 10 Gbps", In 8th {USENIX} Workshop on Offensive Technologies ({WOOT} 14), 2014, Retrieved from https://www.usenix.org/conference/woot14/workshop-program/presentation/adrian, pp. 1-8.

U.S. Appl. No. 17/515,121, filed Oct. 29, 2021, Jeff Cody et al.

* cited by examiner

CONTINUOUS SCANNING ENGINE WITH AUTOMATIC PROTOCOL DETECTION

PRIORITY APPLICATION

This application is a continuation of U.S. patent application Ser. No. 17/515,121, filed Oct. 29, 2021, which is hereby incorporated by reference herein in its entirety.

This invention was made with Government support under Contract No. 2014-14031000011 awarded by the Central Intelligence Agency. The Government has certain rights in the invention.

BACKGROUND

The Internet, in essence, is made up of a variety of services that listen on a port of an IP address, and speak a certain protocol. There are around 4 billion different IP addresses and, potentially around 65,000 different ports per IP address, on the Internet. There are around a few thousand different protocols that could potentially be active per port. A full scan of the Internet that would attempt to communicate on all the ports of all the IP addresses using all the different protocols would encompass around 1.3 quintillion attempts to communicate. Optimistically assuming that each attempt to communicate takes 1 microsecond to complete, completing the entire scan of the Internet would take 1.3 trillion seconds, or around 41,222 years. Therefore, finding all the protocols that are actively operating on any port of all the IP addresses of the Internet has been a daunting task. In addition, the Internet changes at different places at different rates, further preventing any brute force attack on scanning the entire Internet.

Internet-wide network scanning has numerous security applications, including exposing new vulnerabilities and tracking the adoption of defensive mechanisms, but probing the entire public address space with existing tools is both difficult and slow. Internet-scale network surveys collect data by probing large subsets of the public IP address space. While such scanning behavior is often associated with botnets and worms, it also has proved to be a valuable methodology for security research. Recent studies have demonstrated that Internet-wide scanning can help reveal new kinds of vulnerabilities, monitor deployment of mitigations, and shed light on previously opaque distributed ecosystems. Unfortunately, this methodology has been more accessible to attackers than to legitimate researchers, who cannot employ stolen network access or spread self-replicating code. Comprehensively scanning the public address space with off-the-shelf tools like Nmap requires weeks of time or many machines.

SUMMARY

A continuous scanning engine with automatic protocol detection is, in some embodiments, a continuous scan engine that continually and efficiently discovers open ports on publicly accessible hosts, such as on the Internet, identifies the service(s) running on those ports, and completes the appropriate network handshake(s) to understand service configuration and vulnerability. The continuous scanning engine with automatic protocol detection can continuously find all or at least most of the new and changing services on the Internet, in some embodiments. The continuous scanning engine with automatic protocol detection can find new services listening on a random port on a random IP address on Internet, and can gather public information about that service, in some of these embodiments.

In some embodiments, the continuous scanning engine comprises one or more discovery components and one or more protocol detection components. The discovery components, in some embodiments, send initial packets to a plurality of ports of a plurality of network addresses of a network, receive responses to a least some of the initial packets, asynchronously match the received responses to the sent initial packets, and determine that some ports at some network addresses require further analysis. The protocol inspection components, in some embodiments, attempt to communicate with the ports at the network addresses that are found by the discovery components using a plurality of communication protocols, determine that an attempted communication protocols results in a successful communication, and provide the port, the network address, and the attempted communication protocol that resulted in the successful communication to a destination, such as a datastore. This can be a datastore that is representative of the open ports and protocols that are active on those ports on the Internet, in some embodiments.

Figure 1:
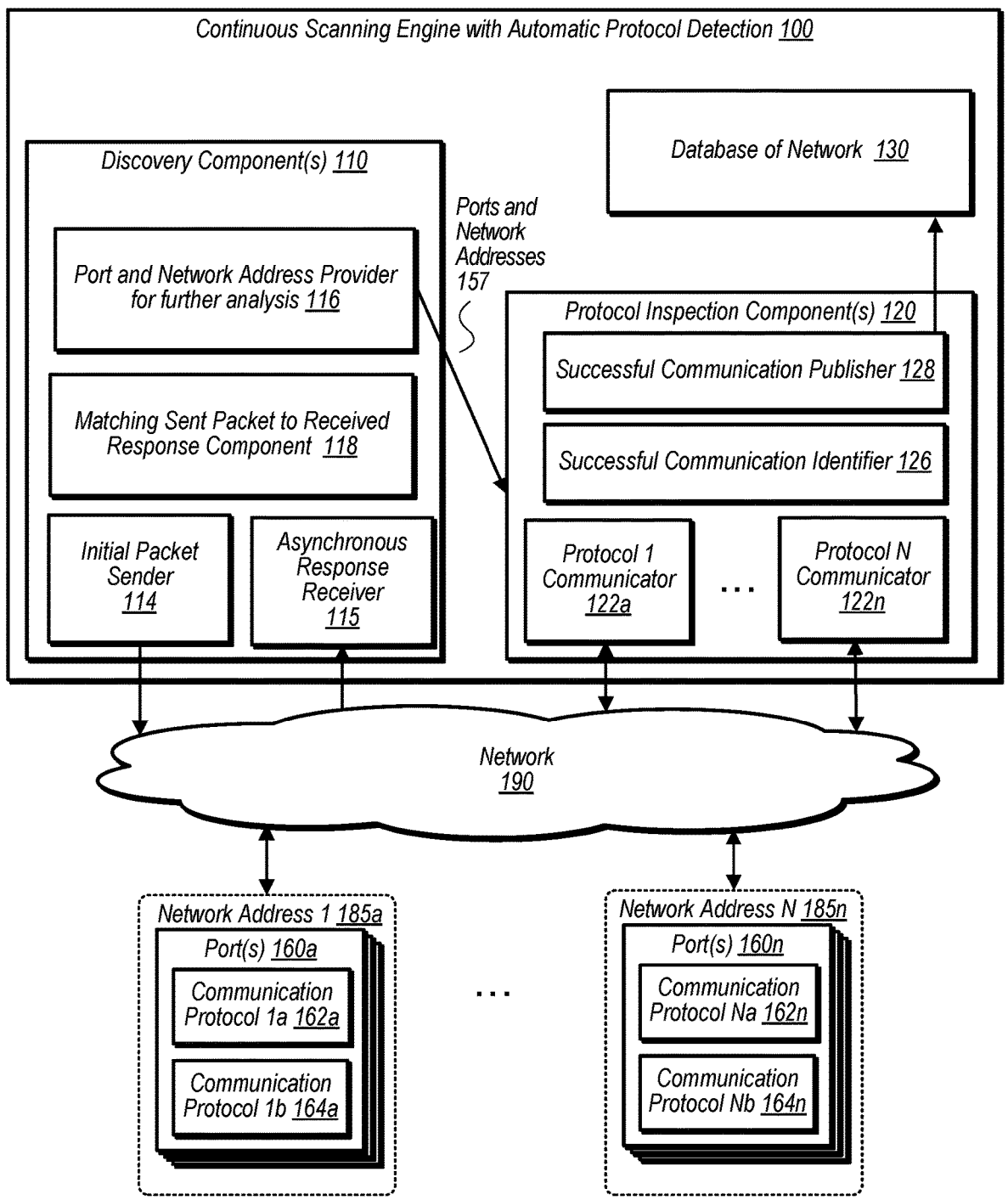
FIG. 1 illustrates an example system environment for the continuous scanning engine with automatic protocol detection that comprises discovery component(s) that scan for open ports across a range of network addresses, and protocol inspection component(s) that identify the communication protocol(s) running on those ports, and communicates the results of those identifications to a database of the network, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

In addition, in the following sections, reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION OF EMBODIMENTS

The systems and methods described herein implement a continuous scanning engine with automatic protocol detection. The continuous scanning engine with automatic protocol detection is, in some embodiments, a continuous scan engine that continually and efficiently discovers open ports on publicly accessible IPv4 hosts, identifies the service(s) running on those ports, and completes the appropriate network handshake(s) to understand service configuration and vulnerability. The continuous scanning engine with automatic protocol detection can continuously find all or at least most of the new and changing services on the Internet, in some embodiments. The continuous scanning engine with automatic protocol detection can find new services listening on a random port on a random IP address on Internet, and can gather public information about that service, in some of these embodiments.

The continuous scanning engine with automatic protocol detection employs continuous scanning, rather than batch scanning, in some embodiments. In addition, the continuous scanning engine with automatic protocol detection decouples port scanning from application layer scanning, in some embodiments. By doing so, the continuous scanning engine with automatic protocol detection enables the definition of application layer scans from non-traditional inputs (e.g. via custom business logic over existing network and scan data), in some embodiments. The continuous scanning engine with automatic protocol detection also enables scanning parts of the Internet more frequently than others, in some embodiments.

The continuous scanning engine with automatic protocol detection is a modular network scanner specifically designed for performing comprehensive Internet-wide research scans, in some embodiments. The continuous scanning engine with automatic protocol detection is capable of scanning for open ports across the entire publicly accessible IPv4 address space, in addition to identifying the service(s) running on those ports, and completing the appropriate network handshake(s) to understand service configuration and vulnerability. The scanning engine's modular architecture can support many types of single-packet probes, including TCP SYN scans, ICMP echo request scans, and application-specific UDP scans, and it can interface easily with user-provided code to perform the follow-up actions on any discovered hosts, such as completing a protocol handshake.

The continuous scanning engine with automatic protocol detection can comprise, in some embodiments, one or more discovery components and one or more protocol detection components. The one or more discovery components can discover, in layman's terms, open ports on the Internet, where some unknown service communicates a potentially unknown communication in response to requests. The one or more discovery components can perform L4 scans by opening a raw socket, and using an address randomization approach, in some of these embodiments. The one or more discovery components can have built-in support for scanning multiple ports, at independent rates set relative to each other. The one or more discovery components can continuously scan a group of the most popular ports (e.g. between 2000-5000 ports) over the full Internet. As one example, the one or more discovery components can send out a large number of TCP SYN packets to these ports across the Internet, and see if any responses are returned. Based on the responses received, the one or more discovery components can formulate a group of candidates to further investigate.

More specifically, the one or more discovery components can create a cyclic multiplicative group for each port that is being scanned, or for each docket of scans, in some embodiments. This allows the one or more discovery components, in these embodiments, to create a pseudorandom permutation that can very inexpensively find out what the next element to be scanned is, without maintaining state about everything that has been scanned, or everything that needs to be scanned. The dimensionality is large enough, such that it takes a tremendous amount of state to keep track of each individual point. The pseudorandom permutations allows the discovery component(s) to determine what to scan next in a stateless way. The probes to various ports and IP addresses can therefore all be sent out statelessly, in these embodiments. In addition, validation data can be encoded into the probes that are sent out, in some embodiments. This validation data will then be repeated back to the sender by the destination servers. Therefore, when the discovery component(s) receive a response, it can validate, using the validation data, that the response was a response to a probe that the discovery component(s) sent out themselves.

The one or more discovery components can also perform intelligent allocation of probe packet bandwidth, in some embodiments. If a giant network has not had any hosts or services associated with it for an extended period of time, then the one or more discovery components can send fewer probes to those addresses, in some embodiments. However, network addresses associated with cloud accounts of large cloud providers change frequently, and therefore, require additional probes. In addition, some ports are used more frequently than other ports based on standard convention, and therefore require more frequent probes for those ports. The one or more discovery components can allocate bandwidth to the right ports and the right networks, in some embodiments.

The one or more protocol detection components can receive the set of candidate port and IP address combinations from the discovery component(s). The protocol detection component(s) can then send a first set of its own probes to the port at the IP address in order to determine the protocol or service at the port. For example, the protocol detection component(s) can attempt to communicate with a port based on what service is commonly assigned to that port. However, if no response is received, or if the response that is received is not decipherable, then additional probes can be sent in order to determine the protocol or service, in some embodiments. Whenever a response is received from a probe, that response can be examined to determine if there is any hint about what protocol or service is communicating at the port/IP address from which the response was received.

Once it is known what protocol is operating at a given port/IP address combination, then the protocol can be used for further communication, in some embodiments. For example, if it is known that the HTTPS protocol is operating at a certain port/IP address, then the protocol detection component(s) can initiate an HTTPS handshake with that port/IP address. The protocol detection component(s) can therefore determine how the protocol at that port/IP address is configured (for example, what cryptographic ciphers does the HTTPS protocol support, what version of software is it, what URL pages exist at different paths on the website, etc.). The protocol detection component(s) can therefore provide a series of follow-up requests once it is known what protocol is operating at that port/IP address.

The protocol detection component(s) can then package this collected data regarding this port/IP address and label it, in some embodiments. The collected data might be raw transcripts of requests sent and responses received. In order to make this collected data more human-readable, protocol detection component(s) can therefore label this data with descriptive labels that are more human-readable (e.g. a specific version of Apache is running on the port/IP address). The data can be combined into an interesting descriptive record of the host, in some embodiments. The protocol detection component(s) can, furthermore, refresh this data regarding this port/IP address on a regular bases, in some embodiments. This refresh can determine, for example, if the service is still present at the port/IP address, and if there have been any changes to the service since the previous scan.

The one or more protocol detection components can therefore employ a "deep scanning" framework that can elicit "deep protocol data" about a service, in some embodiments. The protocol detection component(s) can employ scan modules that take the discovery components' output as input, and output deep scan information about listening hosts identified by the discovery component(s). The protocol detection component(s) can also wrap the scan modules, and add a request mechanism on top of the scan modules that allows hosts to be dynamically scanned, in some embodiments. The protocol detection component(s) can include a "cluster" of scan modules, in some of these embodiments. In some embodiments, a goal of the protocol detection component(s) is to decouple deep scans from host identification and detection, and to decouple protocols from ports. The protocol detection component(s) can take input via a queuing service or RPC call, for example, and can perform deep scans of the requested host on the requested protocol, in some embodiments. The protocol detection component(s) may make multiple connections to a single target (e.g. probing multiple aspects of a TLS configuration), and may output multiple objects in response to a single target, in some embodiments. These objects may refer to other hosts or domains (e.g. by following an HTTP redirect chain), and other services (e.g. being redirected from HTTP to HTTPS), for example.

The protocol detection component(s) can operate on streams of requests, and can run in a cluster, allowing multiple input sources for scan requests, in some embodiments. These input sources might be the output of the discovery component(s), or they might be generated from business logic over known hosts. This allows protocol detection component(s) to have a separate refresh rate from the discovery components' discovery rate. The protocol detection component(s) can refresh all hosts that it has seen before by rescanning them on known open ports, for example. In some embodiments the target refresh rate is daily. The protocol detection component(s) can refresh all hosts faster than it can discover new services across the entire Internet, in some embodiments, where the target discovery rate might be weekly to monthly. In addition, the protocol detection component(s) can more frequently refresh those hosts, or those parts of the Internet for example, that tend to change more frequently. In this way, the protocol detection component(s) can capture the churn or change of those portions of the network close to when they happen, in these embodiments.

The protocol detection component(s) can also provide port-independent scanning, in some embodiments. Port-independent scanning is about separating the protocol being scanned from the port it is running on. At the most fundamental level, it is serviced by allowing the protocol being scanned (SSH, HTTP, RDP, etc., for example) to be specified separately from the port number (22, 443, 3389, for example). The higher level goal of port-independent scanning is to detect services running on non-standard ports, in these embodiments.

Sub-Components of a Continuous Scanning Engine with Automatic Protocol Detection The one or more discovery components can employ, in some embodiments, a number of sub-modules and sub-components. The discovery component(s) can include one or more docket of scan target descriptions and rates, where individual entries of the docket can include a transport layer protocol id to scan, a transport layer port to scan, and/or a relative scan rate. The discovery component(s) can also include an IP Address iterator, in some embodiments. This IP address iterator can, in some embodiments, generate one random permutation of the IPv4 address space per docket-entry. It can do this using a cyclic multiplicative group to minimize stored state, in some embodiments. The IP Address iterator can provide, in some embodiments, a new randomized permutation per docket-entry, such that all the entries of the docket provide a different randomized permutation of the IPv4 address in one "cycle" of the docket. A cycle of the docket occurs when all the entries of the docket have been processed. In addition, the IP address iterator can start a new cycle of randomized permutations per docket-entry at the completion of a previous docket-entry cycle for a continuous unending Internet scan.

In some embodiments, the discovery component(s) can include a "hot" docket of commonly assigned ports on the Internet. This hot docket can be a shorter set of ports, in some embodiments. These ports can be scanned more frequently because the docket size is small. In addition, the discovery component(s) can employ larger extended dockets that can find active ports at Internet address for less commonly assigned port numbers. These larger extended dockets might include around 3000 different ports to be scanned, in some embodiments. By varying these docket sizes, bandwidth can be allocated for different sets of ports depending on their usage. There can be a cluster or fleet of discovery components, where different discovery components are operating on different dockets, in some embodiments. In addition, this fleet of discovery components can be duplicated across different (or each) of the perspectives as well.

The different fixed docket sizes and the number of workers performing scans for each docket can be customized for the discovery component(s), in some embodiments. In this way, the discovery component(s) can allocate bandwidth to prioritize different protocols and networks. In addition, the portion of the network being scanned (such as the Internet) can be customized per docket. A docket can be customized so that it only scans a portion of the Internet, in some embodiments. In some of these embodiments, that portion might be a portion that is known to change more rapidly than other portions. For example, a docket might be customized to scan a portion of IPv4 address set that pertains to large cloud systems, which tend to change more rapidly than other portions of the Internet.

The discovery component(s) can also include a sender module that saturates a transmission network interface with TCP or UDP probe packets that are destined to IP addresses generated by IP address iterator, on the ports specified by the current entry of the docket, in some embodiments. In some of these embodiments, the sender module can provide the TCP or UDP probe packets at a relative rate specified by the current entry of the docket. The discovery component(s) can also include a receiver module that listens on a network interface for responses to probe packets sent by the sender module, in some embodiments. This receiver module can also validate the responses to the probe packets, and can then pass their information (such as their IP address, port, and transport protocol combinations) to one or more protocol detection components. The receiver module might pass this information through the use of a message queue, in some embodiments. The discovery component(s) can also include scan state management that periodically writes the state of the random scan iterations to durable storage, such that processes can be stopped and restarted without regenerating IP address permutations, in some embodiments.

As stated previously, the continuous scanning engine with automatic protocol detection can comprise one or more protocol detection components. The one or more protocol detection components can employ, in some embodiments, a number of sub-modules and sub-components. The protocol detection component(s) can include a framework to do massively concurrent scanning of unrelated protocols, in some embodiments. This massively concurrent scanning can be based on on-demand requests from a message queue, in some of these embodiments. The messages in this message queue might originate from one or more of the discovery components, in some embodiments.

The protocol detection component(s) can also include a protocol type selector that can use one or more heuristics to determine what protocol to use to scan, in some embodiments. The protocol type selector might base its section on the requested port to scan and the requested transport layer to use in the scan, in some of these embodiments. The protocol detection component(s) can also include a data probe system to send small data probes to attempt to elicit data from ports, independent of the port number, in some embodiments.

The protocol detection component(s) can also include a hinting engine that takes any received data from the data probe system, and determines a probabilistic match against various protocols, in some embodiments. The protocol detection component(s) can also include scan module that then performs a deep scan of those protocols with the higher probabilistic match, in some embodiments. The protocol detection component(s) can also include a dynamic asynchronous worker pool for concurrent processing that scales the number of workers up with the scan load. The protocol detection component(s) can also include a ledger system to borrow processing slots from future scans depending on the type of scan being performed, in some embodiments. The ledger system can maintain a weight for each scan type, so that different types consume an appropriate number of asynchronous workers.

Embodiments of a Continuous Scanning Engine with Automatic Protocol Detection

FIG. 1 illustrates an example system environment for the continuous scanning engine with automatic protocol detection (100) that comprises discovery component(s) (110) that scan for open ports across a range of network addresses (185a . . . n), and protocol inspection component(s) (120)

that identify (126) the communication protocol(s) (162a . . . n, 164a . . . n) running on those ports (160a . . . n), and communicates (128) the results of those identifications to a database (130) of the network (190), according to some embodiments. In some of these embodiments, detailed information obtained from the protocol success communication can also be provided to the database.

The discovery component (110) of the continuous scanning engine with automatic protocol detection (100) sends (114) initial packets to a variety of ports (160a . . . n) of a variety of network addresses (185a . . . n) of a network (190). The discovery component (110) then receives (115) responses to a least some of the initial packets. A matching sent packet to received response component (118) then asynchronously matches the received responses to the sent initial packets. The matching component (118) can also determine that at least some of the ports of at least some of the network addresses corresponding to the matched received responses require further analysis, in some embodiments. The port and network address provider for further analysis component (116) of the discovery component (110) can provide information including the port numbers and the network addresses (157) that require further analysis to a protocol inspection component (120).

The protocol inspection component (120) receives the provided information from the discovery component (110), potentially including the port number and network addresses (157) that require further analysis. The protocol inspection component (120) attempts to communicate using a series of protocol communicators (122a . . . n) with some of the obtained ports (160a . . . n) of some of the network addresses (185a . . . n) using different communication protocols. The protocol inspection component (120) determines, using the successful communication identifier component (126), that an attempted communication protocol results in a successful communication with a port of a network address. The protocol inspection component (120) provides, using a successful communication publisher (128) the port number, the network address, and/or the communication protocol that resulted in the successful communication to a database (130), in some embodiments. In some of these embodiments, detailed information obtained from the protocol success communication can also be provided to the database.

The continuous scanning engine with automatic protocol detection 100 can also include a notification module (not shown). The notification module can provide an indication of scanned addresses and/or ports, and/or detected protocols, in some embodiments. It can also trigger a customer-provided function to be executed, in some embodiments. It can also send a message to a remote network indicating the scanned addresses and/or ports, and/or detected protocols, in some embodiments. In addition, or instead, the notification module can remove scanned addresses and/or ports, and/or detected protocols from datasets, such as the database of the network 130, in some embodiments.

In some embodiments, a continuous scanning engine with automatic protocol detection 100, as well as any number of other possible services, operates as part of a service provider network, and each comprise one or more software modules executed by one or more electronic devices at one or more data centers and geographic locations. Client(s) using one or more electronic device(s) (which may be part of or separate from the service provider network) can interact with the various services of the service provider network, such as the continuous scanning engine with automatic protocol detection 100, via one or more intermediate networks, such as the network 190. In other examples, external clients or internal clients can interact with the various services programmatically and without user involvement.

A provider network provides clients with the ability to utilize one or more of a variety of types of computing-related resources such as compute resources (for example, executing virtual machine (VM) instances and/or containers, executing batch jobs, executing code without provisioning servers), data/storage resources (for example, object storage, block-level storage, data archival storage, databases and database tables, etc.), network-related resources (for example, configuring virtual networks including groups of compute resources, content delivery networks (CDNs), Domain Name Service (DNS)), application resources (for example, databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The clients (or "customers") of provider networks may utilize one or more user accounts that are associated with a client account, though these terms may be used somewhat interchangeably depending upon the context of use. Clients may interact with a provider network across one or more intermediate networks 190 (for example, the internet) via one or more interface(s), such as through use of application programming interface (API) calls, via a console implemented as a website or application, etc. The interface(s) may be part of, or serve as a front-end to, a control plane of the provider network that includes "back-end" services supporting and enabling the services that may be more directly offered to clients, such as the continuous scanning engine with automatic protocol detection 100.

To provide these and other computing resource services, provider networks often rely upon virtualization techniques. For example, virtualization technologies may be used to provide clients the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a client may directly utilize a compute instance (e.g., provided by a hardware virtualization service) hosted by the provider network to perform a variety of computing tasks. Additionally, or alternatively, a client may indirectly utilize a compute instance by submitting code to be executed by the provider network (e.g., via an on-demand code execution service), which in turn utilizes a compute instance to execute the code—typically without the client having any control of or knowledge of the underlying compute instance(s) involved.

As indicated above, service provider networks have enabled developers and other users to more easily deploy, manage, and use a wide variety of computing resources, including databases. The use of a database service, for example, enables clients to offload many of the burdens of hardware provisioning, setup and configuration, replication, clustering scaling, and other tasks normally associated with database management. A database service further enables clients to scale up or scale down tables' throughput capacity with minimal downtime or performance degradation, and to monitor resource utilization and performance metrics, among other features. Clients can easily deploy databases for use in connection with a wide variety of applications such as, for example, online shopping carts, workflow engines, inventory tracking and fulfillment systems, the database of networks 130, and so forth.

Figure 2:
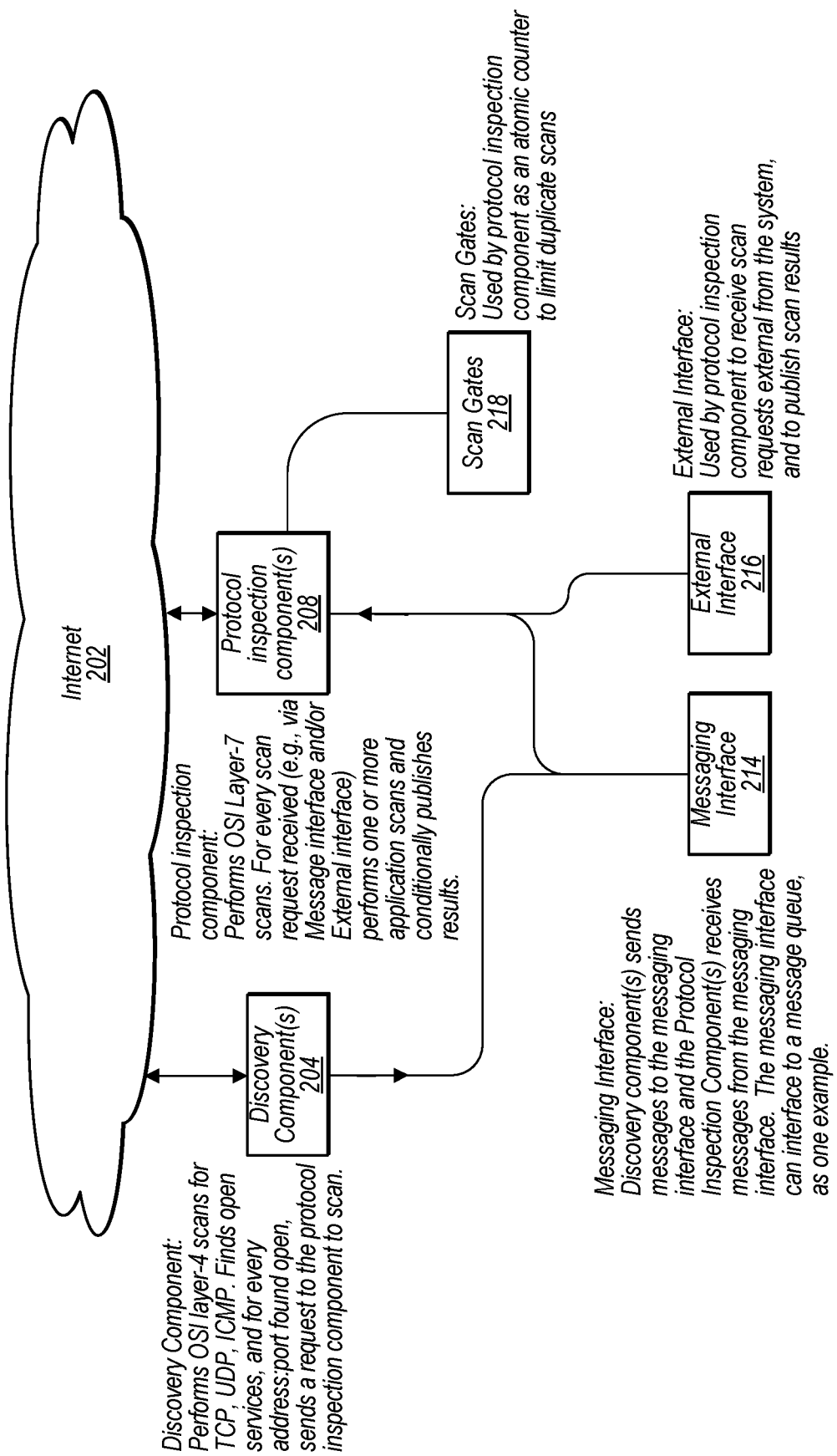
FIG. 2 illustrates further aspects of the example system for a continuous scanning engine with automatic protocol detection, where the discovery component(s) performs OSI layer-4 scans for TCP, UDP, ICMP, finds open services, and for every address:port found open, sends a request through the message data structure to the protocol inspection component to scan, where the protocol inspection component(s) performs an OSI Layer-7 scan, and for every scan request received performs one or more application scans, and conditionally publishes results, where scan-gates are used by protocol inspection component as an atomic counter to limit duplicate scans, and where a pub/sub module is used by protocol inspection component to receive scan requests external from the system, and to publish scan results, according to some embodiments.

FIG. 2 illustrates further aspects of the example system for a continuous scanning engine with automatic protocol detection, where the discovery component(s) (204) performs OSI layer-4 scans for TCP, UDP, ICMP, to find open services. For every address:port found open, the discovery component(s) (204) sends a message using the messaging interface (214) to the protocol inspection component (208) to scan. The discovery component(s) (204) sends messages to the messaging interface (214) and the Protocol inspection component(s) (208) receives messages from the messaging interface (214). The messaging interface (214) can interface to a message queue, as one example. The messaging interface (214) might be an API to a messaging service, in another example. The messaging interface (214) can interface to any data structure, service, or system that allows messages to be passed from a sender to a receiver.

The protocol inspection component(s) (208) then performs an OSI Layer-7 scan. For every scan request received, the protocol inspection component(s) (208) performs one or more application scans, and conditionally publishes results. The scan gates (218) can be used by the protocol inspection component(s) (208) as an atomic counter to limit duplicate scans. The protocol inspection component (208) can query the scan gates (218) to determine whether they will allow the scan. The scan gates (218) check against excessive duplicate scans to a host:port. The external interface (216) can be used by protocol inspection component (208) to receive scan requests external from the system, and to publish scan results, according to some embodiments.

Figure 3:
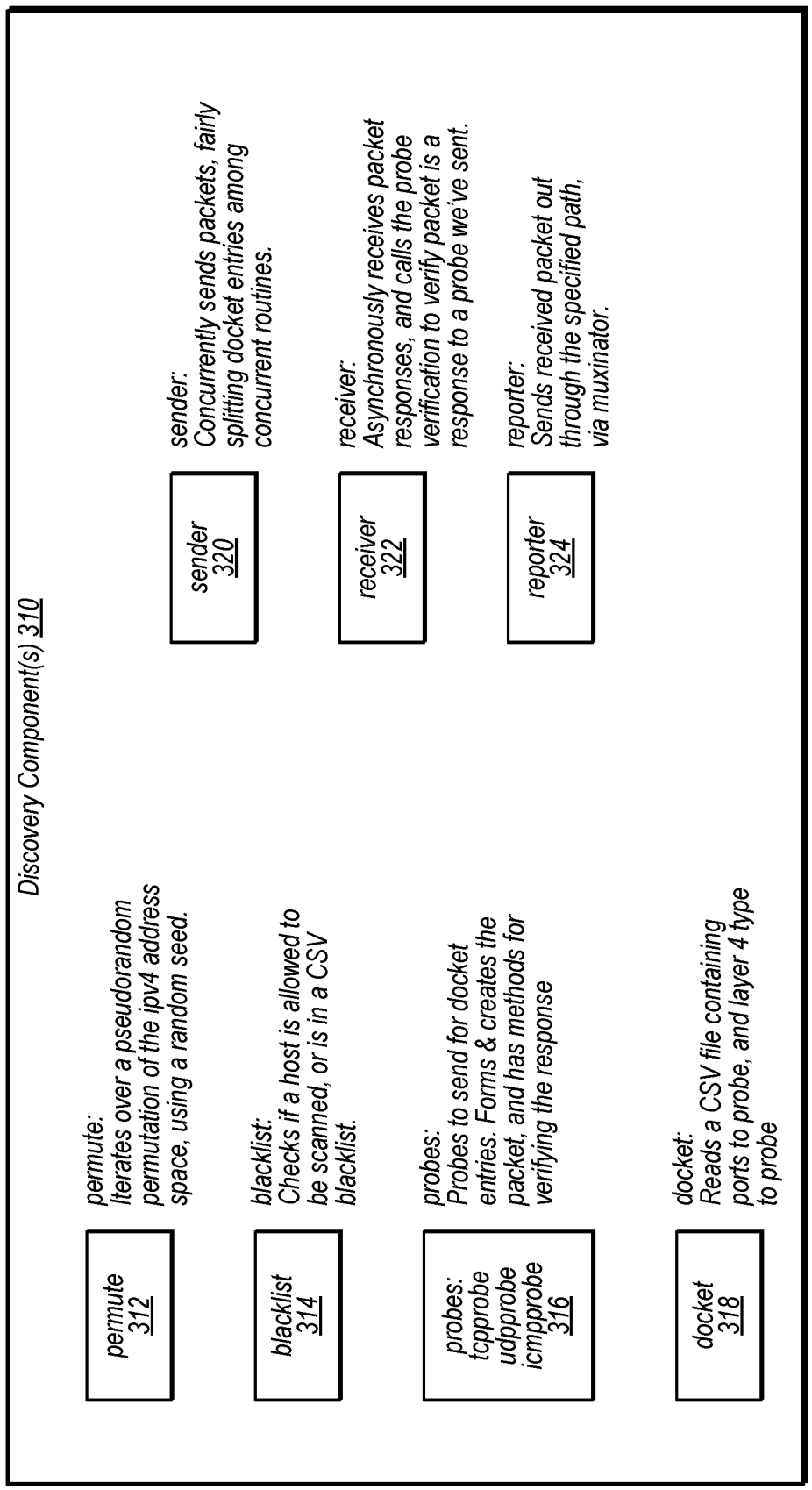
FIG. 3 illustrates further aspects of a discovery component of the example system for a continuous scanning engine with automatic protocol detection, where the discovery component can comprise a permute component, a blacklist component, probes component(s), a docket component, a sender component, a receiver component, and a reporter component, according to some embodiments.

FIG. 3 illustrates further aspects of a discovery component (310) of the example system for a continuous scanning engine with automatic protocol detection, where the discovery component can comprise a permute component (312), a blacklist component (314), probes component(s) (316), a docket component (318), a sender component (320), a receiver component (322), and a reporter component (324), according to some embodiments.

The discovery component(s) (310) can include a docket (318) of scan target descriptions and rates, where individual entries of the docket can include a transport layer protocol id to scan, a transport layer port to scan, and/or a relative scan rate. The docket (318) can read a CSV file, for example, containing ports to probe, and layer 4 types to probe, in some embodiments. The discovery component(s) (310) can also include an IP Address iterator or permute (312) component, in some embodiments. This IP address iterator (312) can, in some embodiments, generate one random permutation of the IPv4 address space per docket-entry. It (312) can iterate over a pseudorandom permutation of the IPv4 address space, using a random seed, in some embodiments. It can do this using a cyclic multiplicative group to minimize stored state, in some embodiments. The IP Address iterator (312) can provide, in some embodiments, a new randomized permutation per docket-entry, such that all the entries of the docket provide a different randomized permutation of the IPv4 address in one "cycle" of the docket. In addition, the IP address iterator can start a new cycle of randomized permutation per docket-entry at the completion of a previous docket-entry cycle for a continuous unending Internet scan. The IP addresses produced by the permute component (312) can be checked against a blacklist by a blacklist component (314). The blacklist component (314) checks if a host is allowed to be scanned, or is in a CSV blacklist.

The discovery component(s) can also include a sender module (320) that saturates a transmission network interface with TCP or UDP probe packets that are destined to IP addresses generated by IP address iterator (312), on the ports specified by the current entry of the docket (318), in some embodiments. These probe packets can be formed and created by the probes component (316). The probes component (316) forms and creates the packet, and has methods for verifying the response. The probes component (315) creates probes to send for docket entries, and these probes can be a tcpprobe, udpprobe, and/or icmpprobe, depending on the embodiment. In some of these embodiments, the sender module (320) can provide the TCP or UDP probe packets at a relative rate specified by the current entry of the docket. The sender module (320) can concurrently send packets, fairly splitting docket entries among concurrent routines, in some embodiments.

The discovery component(s) can also include a receiver module (322) that listens on a network interface for responses to probe packets sent by the sender module (320), in some embodiments. The receiver module (322) can asynchronously receive packet responses, and call the probe verification to verify packet is a response to a probe that was sent by the sender (320), in some embodiments. This receiver module (322) can also validate the responses to the probe packets, and can then pass their information (such as their IP address, port, and transport protocol combinations) to one or more protocol detection components. The receiver module (322) might pass this information through the use of a message interface, such as a message queue, in some embodiments. The discovery component(s) can also include scan state management or a reporter module (324) that periodically writes the state of the random scan iterations to durable storage, such that processes can be stopped and restarted without regenerating IP address permutations, in some embodiments. The reporter module (324) sends received packets out through the specified path, in some embodiments.

Figure 4:
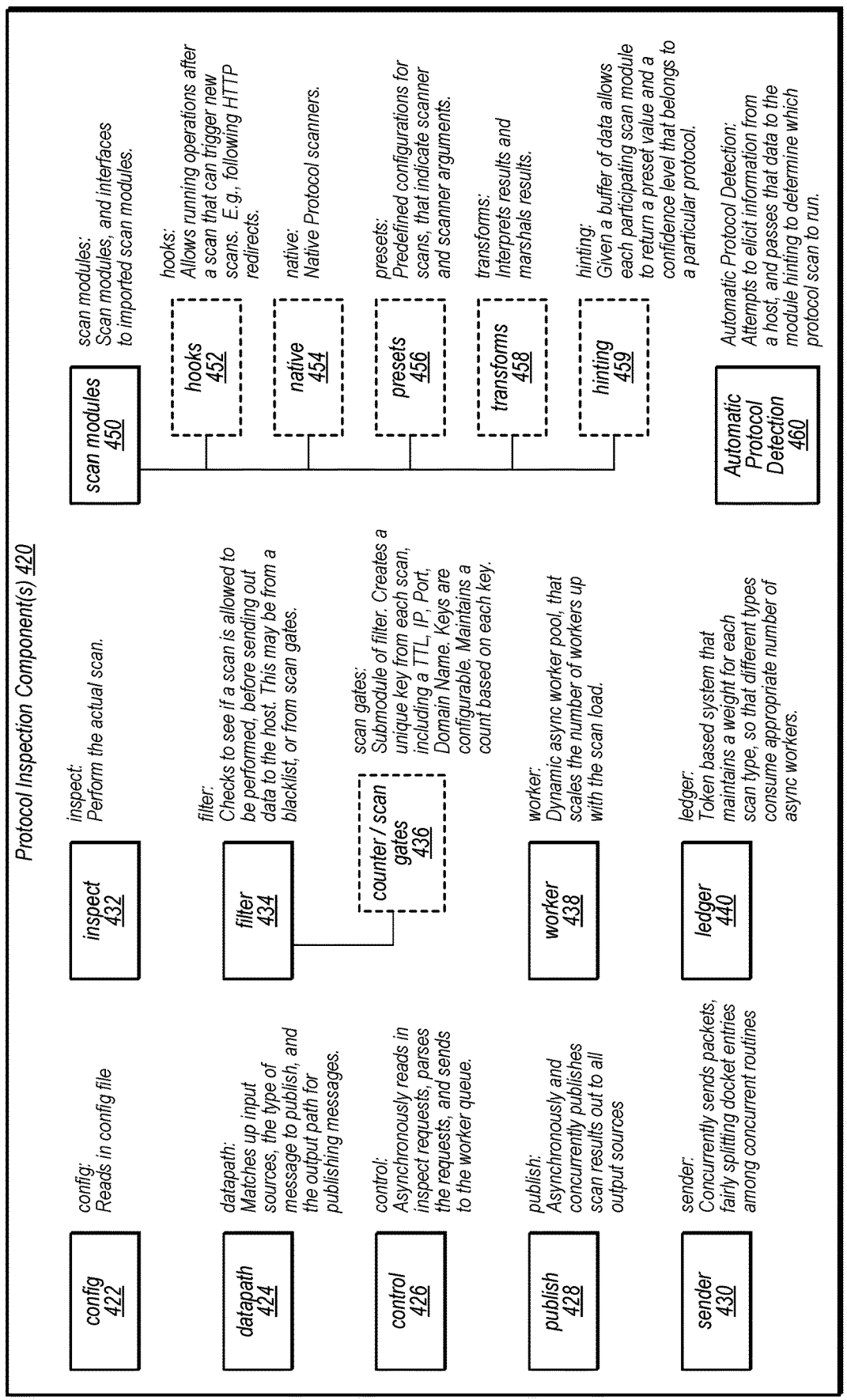
FIG. 4 illustrates further aspects of a protocol inspection component of the example system for a continuous scanning engine with automatic protocol detection, where the protocol inspection component(s) can comprise a config component, a datapath component, a control component, a publish component, a sender component, an inspect component, a filter component, a worker component, a ledger component, scan modules, and an automatic protocol detection component, according to some embodiments.

FIG. 4 illustrates further aspects of a protocol inspection component (420) of the example system for a continuous scanning engine with automatic protocol detection, where the protocol inspection component(s) can comprise a config component (422), a datapath component (424), a control component (426), a publish component (428), a sender component (430), an inspect component (432), a filter component (434), a worker component (438), a ledger component (440), scan modules (450), and an automatic protocol detection component (460), according to some embodiments.

The protocol detection component(s) can include a framework to control (426) massively concurrent scanning of unrelated protocols, in some embodiments. This massively concurrent scanning can be based on on-demand requests from a message interface or message queue, in some of these embodiments. The messages from this message interface might originate from one or more of the discovery components, in some embodiments. The control module (426) can asynchronously read in requests sent to the protocol inspection component(s) (420), can parse the requests, and can send the requests to the worker queue. Setup can be accomplished by the config (422) and datapath (424) components, where the config component (422) reads in a config file, and the datapath component (424) matches up input sources, the type of message to publish, and the output path for publishing messages.

The protocol detection component(s) can also include a protocol type selector or Automatic protocol detection (460)

that can use one or more heuristics to determine what protocol to use to scan, in some embodiments. Automatic protocol detection (460) attempts to elicit information from a host, and can pass that data to the module hinting to determine which protocol scan to run. The protocol type selector might base its section on the requested port to scan and the requested transport layer to use in the scan, in some of these embodiments. The protocol detection component(s) can also include a data probe system to send small data probes to attempt to elicit data from ports, independent of the port number, in some embodiments.

The protocol detection component(s) can also include a hinting engine (459) that determines a probabilistic match against various protocols, in some embodiments. Given a buffer of data, the hinting engine (459) allows each participating scan module to return a preset value and a confidence level that belongs to a particular protocol. The protocol detection component(s) can also include the scan module (450) that then performs a deep scan of those protocols with the higher probabilistic match, in some embodiments. The scan modules (450) can include a number of sub-components. These sub-components include hooks (452) which allows running operations after a scan that can trigger new scans (e.g., following HTTP redirects). They also include native protocol scanners (454), presets (456) which are predefined configurations for sans, that indicate a scanner and scanner arguments, and transforms (458) ant interprets results and marshals results.

The protocol detection component(s) can also include a dynamic asynchronous worker pool (438) for concurrent processing that scales the number of workers up with the scan load. The protocol detection component(s) can also include a ledger system (440) to borrow processing slots from future scans depending on the type of scan being performed, in some embodiments. The ledger system (440) can be a token-based system, and can maintain a weight for each scan type, so that different types consume an appropriate number of asynchronous workers.

The rate at which messages are processed from the message queue can be a function of the resource sizing of the scan engine, in some embodiments. The scan engine will usually process scan requests as fast as the scan resources will allow, in some embodiments. However, in some embodiments, the ledger system can prioritize some scans over other scans. For example, there are some scans that are more resource intensive than other scans. The ledger system can provide a weighting for each one of the different scan modules for each one of the supported communication protocols. In addition, there can be a dynamic worker system, where the workers are created and run when they are needed, in some embodiments. However, in some embodiments, there is a maximum limit of the number of workers that can run simultaneously. The ledger's weighting, therefore, can determine how many workers a particular scan requires from the dynamic worker pool. If there are not enough workers left to allocate, then a particular scan request can block until there are enough workers that it can use to scan. This can be similar to a token-bucket algorithm, in some embodiments.

The inspect module (432) performs the actual scan. However, before the scan can be performed, the filter component (434) checks to see if a scan is allowed to be performed, before sending out data to the host. This checking may be from a blacklist, or from scan gates. The scan gates (436) are a submodule of the filter. The scan gates (436) creates a unique key from each scan, including potentially a TTL, IP, Port, Domain Name, in some embodiments. The keys can configurable, in some of these embodiments. The scan gates (436) maintains a count based on each key. The sender module (430) actually sends the packets as part of the scan. The sender module (430) concurrently sends packets, fairly splitting docket entries among concurrent routines. Once results are determined from the scan, the publisher (428) can asynchronously and concurrently publishes scan results out to all output sources, in some embodiments.

Figure 5:
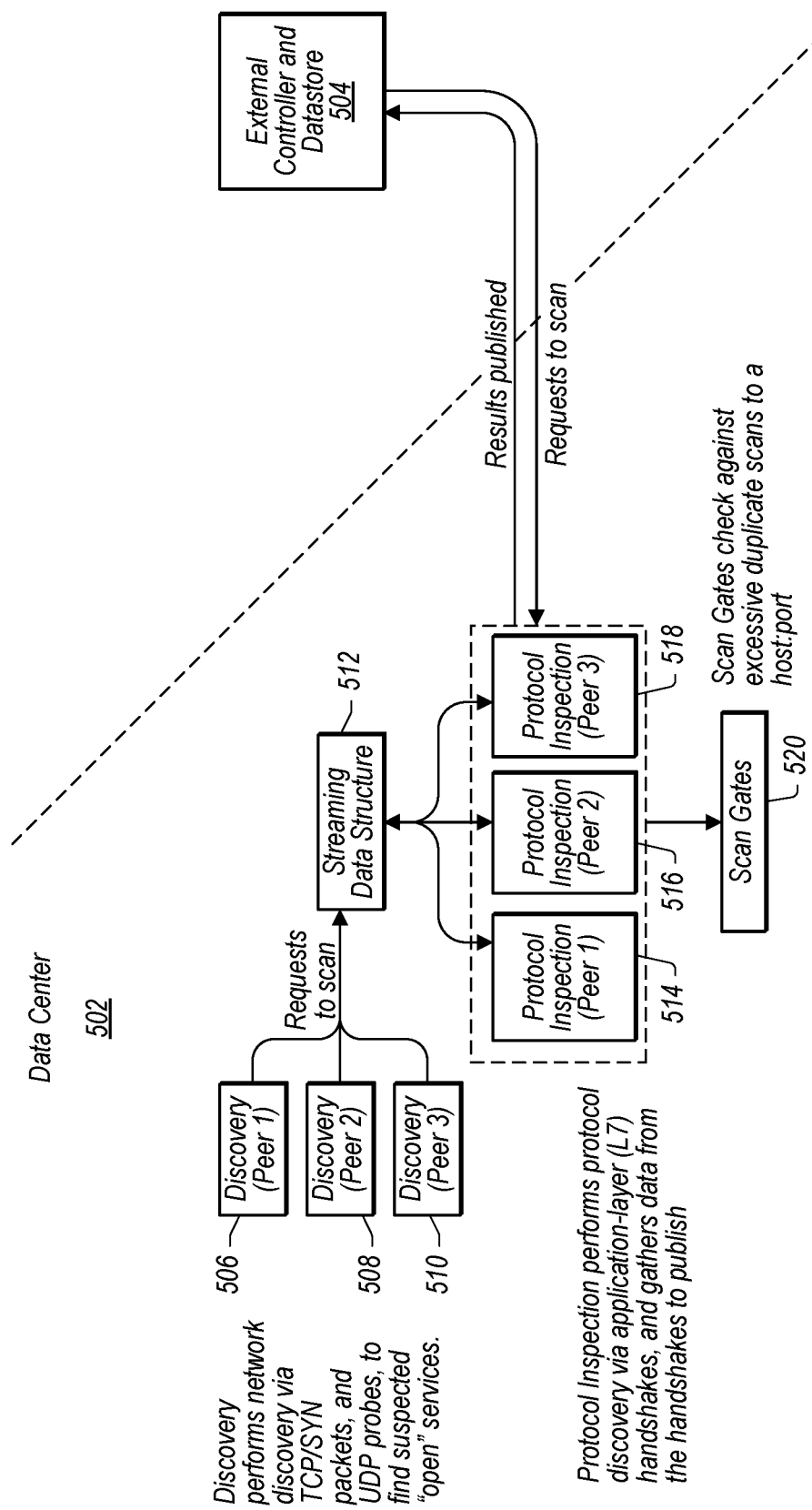
FIG. 5 illustrates further aspects of the example system for a continuous scanning engine with automatic protocol detection, where a data center includes discovery components that performs network discovery to find suspected open services, and provides requests to scan to a streaming data structure that provides the requests to protocol inspection components that performs protocol discovery via application-layer handshakes, where a controller and database provide additional requests to scan to the protocol inspection components and receives results published from the protocol inspection components through a pubsub module, according to some embodiments.

FIG. 5 illustrates further aspects of the example system for a continuous scanning engine with automatic protocol detection. In FIG. 5, a data center (502) includes the continuous scanning engine with automatic protocol detection. Discovery components (506, 508, and 510) performs network discovery to find suspected open services. This network discovery can be via TCP/SYN packets, and/or UDP probes depending on the embodiment. In some embodiments, the discovery component(s) can use three different ISPs, such as 3 different Tier 1 ISPs. These are labeled "Peer 1," "Peer 2," and "Peer 3" in the figure. In some embodiments, there might be peering arrangements with these ISPs. These Tier 1 ISP might be in different geographic locations, such as across North America, Asia, and Europe. In some embodiments, these Tier1 ISPs might be Hurricane Electric ("HE"), NTT Communications ("NTT"), and Telia Carrier ("Telia"). These discovery components that use these 3 different Tier 1 ISPs can be said to be different "perspectives" of the discovery component. Perspectives are described in a separate section below.

The Discovery components (506, 508, and 510) provide requests to scan to a streaming data structure (512) that provides the requests to protocol inspection components (514, 516, 518). These protocol inspection components (514, 516, 518) perform protocol discovery via application-layer (layer 7) handshakes, and gathers data from the handshakes to publish. In some embodiments, the protocol inspection components (514, 516, 518) can use three different ISPs, such as 3 different Tier 1 ISPs. These are labeled "Peer 1," "Peer 2," and "Peer 3" in the figure. In some embodiments, there might be peering arrangements with these ISPs. These Tier1 ISP might be in different geographic locations, such as across North America, Asia, and Europe. In some embodiments, these Tier1 ISPs might be Hurricane Electric ("HE"), NTT Communications ("NTT"), and Telia Carrier ("Telia"). An external controller and database (504) can provide additional requests to scan to the protocol inspection components (514, 516, 518). The external controller and database (504) can also receive results published from the protocol inspection components (514, 516, 518), according to some embodiments. The protocol inspection components (514, 516, 518) can also query the scan gates (520) to determine whether they will allow the scan. The scan gates (520) can check against excessive duplicate scans to a host:port.

Figure 6:
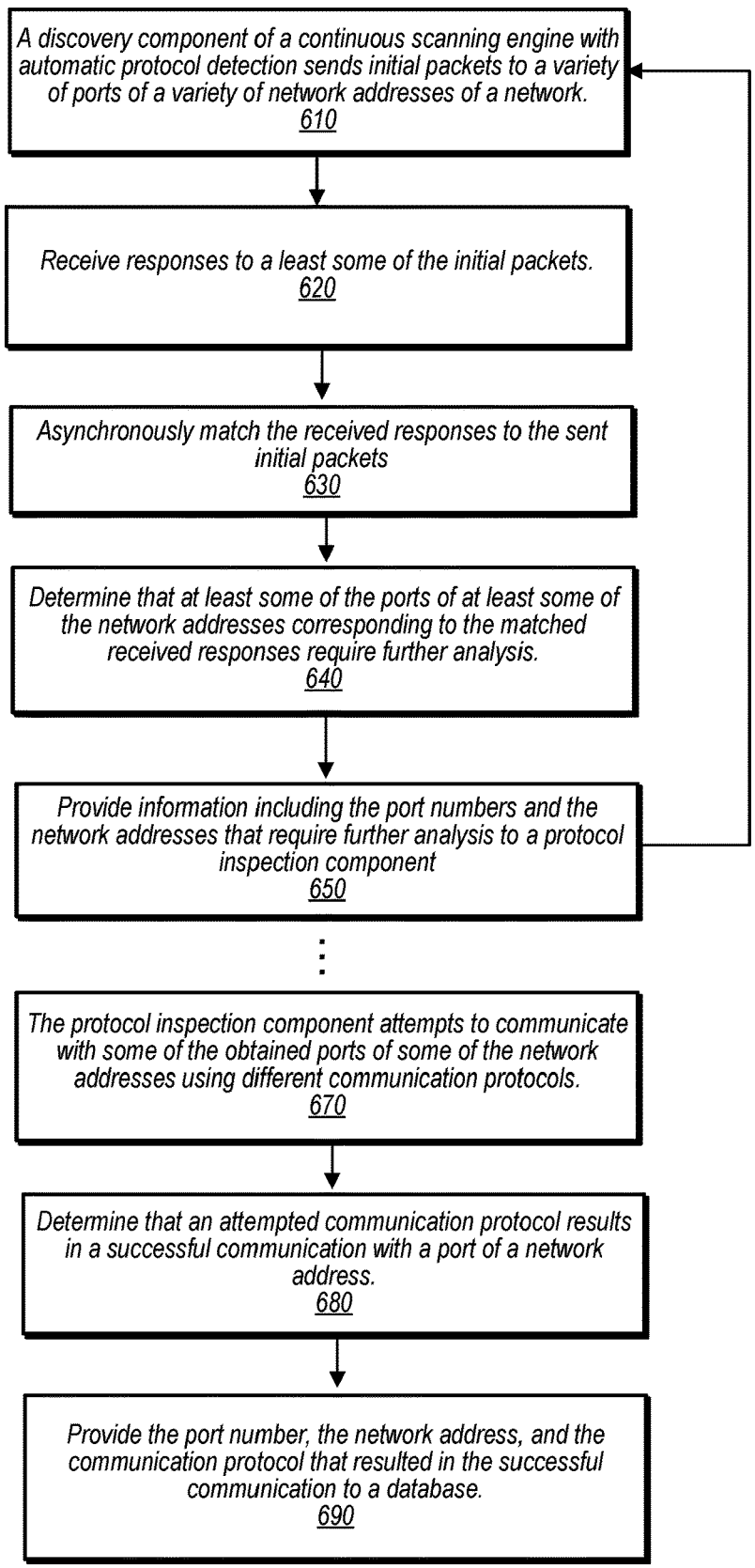
FIG. 6 is a flowchart of an illustrative method that can be implemented by a continuous scanning engine with automatic protocol detection, where a discovery component of the continuous scanning engine with automatic protocol detection sends initial packets to ports and network addresses, receives responses, matches the responses to the sent packets, determines that some ports at some network addresses require further analysis, and provides the ports and network addresses to the protocol inspection component, and where a protocol inspection component of the continuous scanning engine attempts to communicate with the ports at the network addresses using various communication protocols, determines that a communication protocol results in a successful communication, and provides the port, network address, and communication that resulted in a successful communication to a database.

Illustrative Methods of a Continuous Scanning Engine with Automatic Protocol Detection FIG. 6 is a flowchart of an illustrative method that can be implemented by a continuous scanning engine with automatic protocol detection, where a discovery component of the continuous scanning engine with automatic protocol detection sends initial packets to ports and network addresses, receives responses, matches the responses to the sent packets, determines that some ports at some network addresses require further analysis, and provides the ports and network addresses to the protocol inspection component. A protocol inspection component of the continuous scanning engine attempts to communicate with the ports at the network addresses using various communication protocols, determines that a communication protocol results in a successful communication, and provides the port, network address, and communication that resulted in a successful communication to a database, in some embodiments. In some of these embodiments, detailed information obtained from the protocol success communication can also be provided to the database.

The flowchart begins at block 610 where a discovery component of a continuous scanning engine with automatic protocol detection sends initial packets to a variety of ports of a variety of network addresses of a network. The discovery component then receives responses to a least some of the initial packets in 620. The flowchart transitions to 630 in which the discovery component asynchronously match the received responses to the sent initial packets. The flowchart transitions to 640 which determines that at least some of the ports of at least some of the network addresses corresponding to the matched received responses require further analysis. In the next block 650, the discovery component provides information including the port numbers and the network addresses that require further analysis to a protocol inspection component. After block 650, the flowchart returns to block 610 where the discovery component again sends initial packets to a variety of ports of a variety of network addresses of a network.

Therefore, the discovery component implements a "continuous" scan such that sometime after one discovery cycle begins, the next discovery cycle begins, in some embodiments. Of course, continuous does not mean that the discovery component must operate without interruption for the remainder of all time in the future. It simply means that when operating, a new discovery cycle will begin sometime after a previous one has begun. The new discovery cycle might be different than the previous cycle, and might send initial packets to different ports and/or addresses. The new discovery cycle might begin before the previous one ends, or might begin sometime after the previous one ends. There might be interruptions in the discovery component's operations, such as might be caused by power outages, maintenance, or whole host of other issues. The discovery component might even be offline or non-operational for an extended period of time. However, when in operation, then the discovery component does not enter a state where it plans to not send initial packets to ports and network addresses in the future. The discovery component's current state or a certain future state will be to send initial packets to a variety of ports of a variety of network addresses of a network, in the "continuous" embodiments.

In conjunction with the operation of the discovery component, the protocol inspection component also performs operations in the flowchart of FIG. 6. At block 670, the protocol inspection component attempts to communicate with some of the obtained ports of some of the network addresses using different communication protocols. The flowchart then transitions to block 680 which determines that an attempted communication protocol results in a successful communication with a port of a network address. The flowchart for the protocol inspection component ends at block 690 which provides the port number, the network address, and the communication protocol that resulted in the successful communication to a database, in some embodiments. In some of these embodiments, detailed information obtained from the protocol success communication can also be provided to the database.

Figure 7:
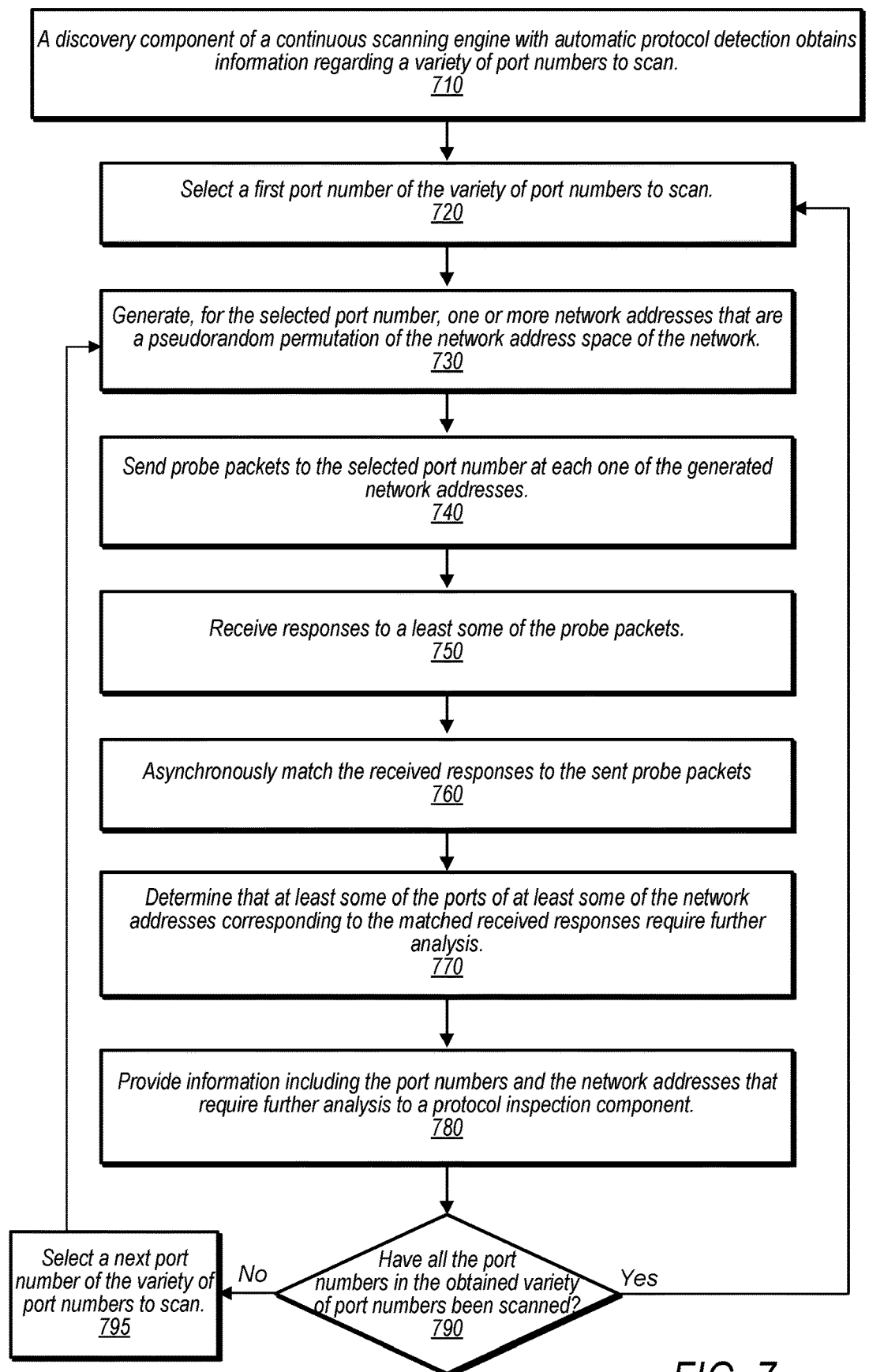
FIG. 7 is a flowchart of an illustrative method that can be implemented a discovery component of the continuous scanning engine with automatic protocol detection, where the discovery component obtains information about port numbers to scan, generates a pseudorandom permutation of network addresses for each port number, and sends probe packets to the port number at the generated network addresses, according to some embodiments.

FIG. 7 is a flowchart of an illustrative method that can be implemented a discovery component of the continuous scanning engine with automatic protocol detection, where the discovery component obtains information about port numbers to scan, generates a pseudorandom permutation of one or more network addresses for each port number, and sends probe packets to the port number at the generated network addresses, according to some embodiments.

The flowchart begins at 710 where a discovery component of a continuous scanning engine with automatic protocol detection obtains information regarding a variety of port numbers to scan. The flowchart transitions to block 720 which select a first port number of the variety of port numbers to scan. The flowchart then transitions to block 730 which generates, for the selected port number, one or more network addresses that are a pseudorandom permutation of the network address space of the network. In some embodiments, what is created is a generator function, that uses cyclic integer multiplication modulo a prime number. Every time this generator function is called, a new number in the random walk is created, but it is guaranteed to be exhaustive and to repeat. The discovery component then sends probe packets to the selected port number at each one of the generated network addresses at block 740. The discovery component receives responses to a least some of the probe packets in block 750. The flowchart then transitions to 760 which asynchronously matches the received responses to the sent probe packets. At 770, the method determines that at least some of the ports of at least some of the network addresses corresponding to the matched received responses require further analysis. The flowchart then transitions to block 780 which provides information including the port numbers and the network addresses that require further analysis to a protocol inspection component.

Figure 8:
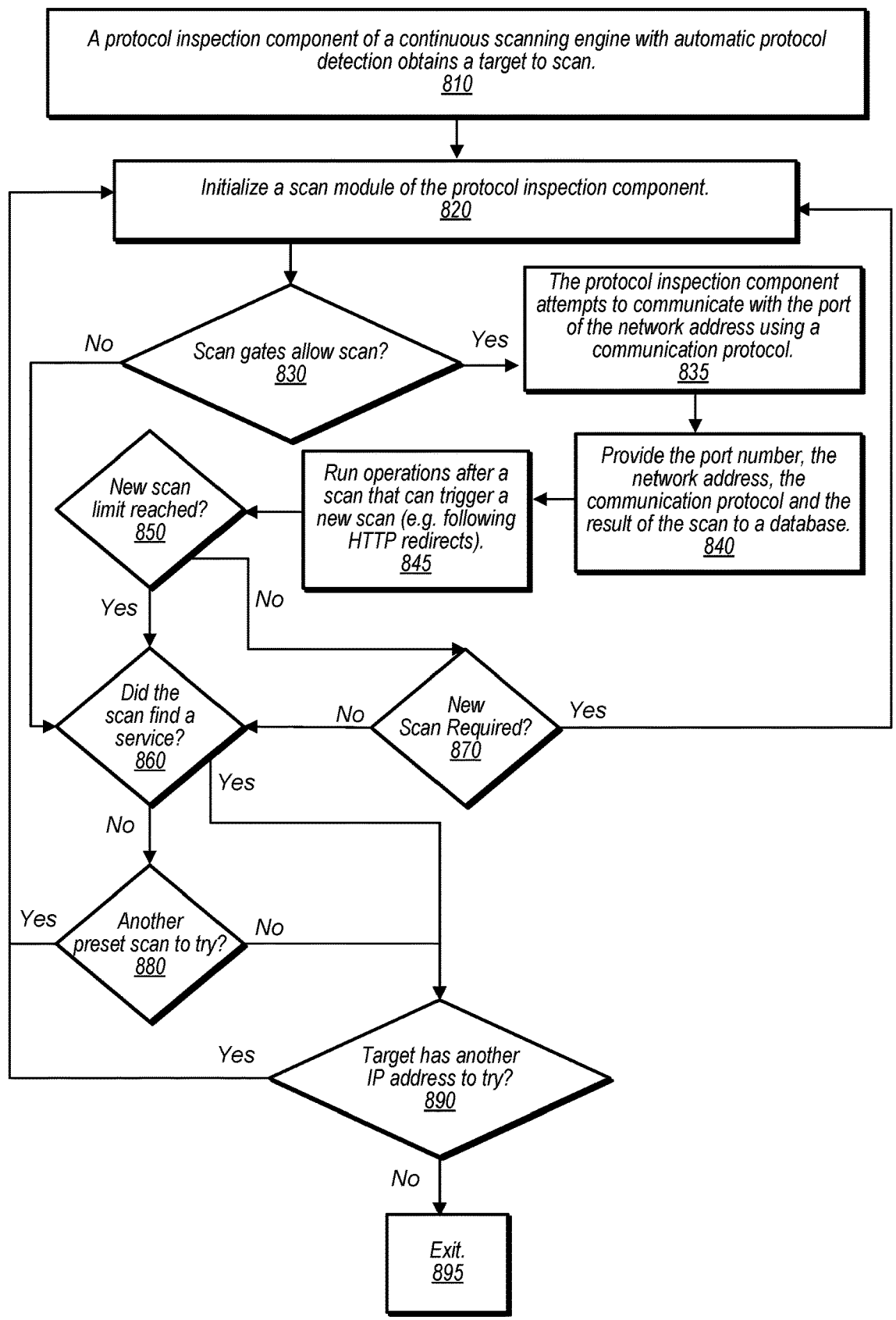
FIG. 8 is a flowchart of an illustrative method that can be implemented by a protocol inspection component of a continuous scanning engine with automatic protocol detection, according to some embodiments.

Block 790 asks whether all the port numbers in the obtained variety of port numbers have been scanned. If all the port numbers have not been scanned, the flowchart transitions to block 795 which selects a next port number of the variety of port numbers to scan, and then transitions back to block 730 which generates, for the selected port number, network addresses that are a pseudorandom permutation of the network address space of the network. If all the port numbers in the obtained variety of port numbers have been scanned, then the flowchart returns to block 720 which again selects a first port number of the variety of port numbers to scan. Thus, the discovery component of this flowchart of FIG. 7 operates in a "continuous" manner, as described above. Therefore, a discovery component can restart the generation of a plurality of network addresses for each of a plurality of port numbers to scan, such that the discovery component implements a continuous network scan FIG. 8 is a flowchart of an illustrative method that can be implemented by a protocol inspection component of a continuous scanning engine with automatic protocol detection, according to some embodiments. The flowchart begins at block 810 where a protocol inspection component of a continuous scanning engine with automatic protocol detection obtains a target to scan. The target might be a port number and a network address, or the target might be The flowchart then transitions to block 820 which initializes a scan module of the protocol inspection component. The protocol inspection component then queries the scan gates to determine whether they will allow the scan (830). The scan gates check against excessive duplicate scans to a host:port. If the scan gates allow the scan at 830, then the protocol inspection component attempts to communicate with the port of the network address using a communication protocol, at block 835. The protocol inspection component then provides the port number, the network address, the communication protocol and the result of the scan to a database in block 840. The flowchart then transitions to block 845 which runs operations after a scan that can trigger a new scan (e.g., following HTTP redirects). The operations at 845 might actually trigger a new scan, and this question is asked in block 870.

The flowchart of FIG. 8 then enters a series of decision blocks to determine the next operations to perform, or whether to exit the flowchart. After operations are run that can potentially trigger a new scan (e.g., following HTTP redirects), the flowchart determines whether a new scan is required by these operations at 870. However, first, the flowchart transitions to block 850 which asks if a new scan limit has been reached. The protocol inspection component has a limit on the number of new scans that can be performed, in some embodiments. For example, the protocol inspection component only allows a certain number of HTTP redirects before it stops following the redirects. This prevents infinite loops from occurring, in some of these embodiments. If one of these limits has been triggered then the new scan limit has been reached in 850, and there is no need to ask if a new scan is required in 870. If a new scan limit has been reached in 850, the flowchart transitions directly to 860. If, however, the new scan limit has not been reached at 850, then the flowchart transitions to 870 which asks whether a new scan is required. If a new scan is required, then the flowchart returns to 820 which initializes the scan module. If, however, a new scan is not required, then the flowchart transitions to block 860.

Block 860 begins a series of 3 decision blocks that determines the next operations to perform, or whether to exit the flowchart. No matter which paths have been taken up until this point in the flowchart, all the paths will pass through 860. The "No" path from 830, the "Yes" path from 850, and the "No" path from 870 all coalesce at 860. Block 860 asks if the scan that was run find a service. If the scan did find a service, that means we don't need to scan that IP address anymore, since a service was found. Therefore, a "Yes" answer to 860 transitions to 890, which is the last decision block check before exiting. If the scan did not find a service at 860, then the flowchart transitions to block 880 which asks if there is another preset scan to try. This question gets asked if a service was not found using one scan, to determine if another scan (where the other scan might use a different communication protocol, for example) can be tried for that port and/or IP address. If there is another preset scan to try at 880, the flowchart transitions back to 820 to initialize a scan module. If, however, there is not another preset scan to try at 880, the flowchart transitions to 890, which is the last decision block check before exiting.

Decision block 890 asks the question whether the target has another IP address to try. In some embodiments, the scan requests received by the protocol inspection component might contain multiple IP addresses, or a range of IP addresses. In this case, there might be additional IP addresses to try to scan, which would require a "Yes" answer to decision block 890. In other embodiments, the target might be specified as a domain name, and the domain name might resolve to a number of IP addresses. In this case, there might be additional IP addresses to try to scan, which would require a "Yes" answer to decision block 890. If the target has additional IP addresses to try, the flowchart returns to block 820 which initializes the scan module. If however, the target does not have any additional IP addresses to try at decision block 890, the flowchart simply transitions to block 895 and exits.

Multi-Perspective Coordination for Discovery and Refresh

Some addresses on the Internet might be reachable from some ISPs but not from others. In addition, there might be outages on the Internet such that one ISP cannot reach a certain IP address, but another ISP can. There might be networking errors that are just transient for a particular route on the Internet. In addition, the routing might be different to a given IP address from different ISPs, and there might be non-transient differences in the network that might cause a probe from a certain ISP to not see a particular host. In addition, there may be hosts that might act differently depending on where the traffic is coming from.

Therefore, to increase overall coverage and to eliminate any transient errors, a scan of a port/IP address can be initiated from multiple different Tier 1 Internet providers and/or multiple geographic regions by both the discovery component(s) and the protocol inspection component(s). The different networks and/or physical locations and/or points of presence and/or data centers from which a scan is run can be referred to as different perspectives. In some embodiments, the protocol inspection component(s) can use three different Internet service providers ("ISPs"), such as 3 different Tier 1 ISPs. In some embodiments, there might be peering arrangements with these ISPs. These Tier1 ISPs might be in different geographic locations, such as across North America, Asia, and Europe. In some embodiments, these Tier1 ISPs might be Hurricane Electric, NTT Communications, and Telia Carrier.

In some embodiments, the discovery component(s) can perform their scans independently from each one of the ISPs, thus creating different perspectives. The discovery component(s) can send out their TCP and UDP packets for discovery from each one of these perspectives. In some embodiments, if a probe sent to a port/IP address did not elicit a response from one perspective, then another perspective can attempt to communicate with the same port/IP address at a different. When a resource is discovered at a particular port/IP address from a particular perspective, the information regarding that resource can get sent to the protocol inspection component(s). The protocol inspection component(s) can then attempt to scan the resource at that particular port/IP address from the same perspective from which it was discovered by the discovery component(s), in some embodiments.

As stated previously, the protocol inspection component(s) can, in some embodiments, refresh information about services and hosts that it already knows about, in order to keep the known data fresh and up to date, rather than waiting for a new discovery to happen. Therefore, if the data is stale, the protocol inspection component(s) might send itself, or an external entity might send the protocol inspection component(s), a new scan request for the stale data. During this refresh process, the protocol inspection component(s) can start from a random perspective, in some embodiments, which might be whichever perspective happens to begin processing the refresh request first. If a perspective handling the refresh is able to validate that the particular resource or service whose data is being refreshed is still there, then any other perspectives can be short-circuited, and the current perspective can simply report back success, in some embodiments. Therefore, during the refresh process, the protocol inspection component(s) will only scan a target the minimum number of times needed.

However, when the protocol inspection component(s) are refreshing the status of known protocols at known ports/IP address, if a particular perspective does not receive a response from a particular known port/IP address, then a different perspective can attempt to communicate with that same particular known port/IP address, in some embodiments. This can happen by the scan request getting injected back into the scan system, and one of the remaining perspective scanning engines can pick it up. The next perspective will then also attempt to communicate with the resource or service, as the previous perspective did. Only if none of the perspectives are able to communicate with a particular known port/IP address will that particular known port/IP address be removed or pruned from a dataset of active ports/IP addresses, in some embodiments. This can occur by the protocol inspection component(s) sending a negative result to the dataset. Therefore, all the perspectives are used to determine that previous valid resource or service should be removed from the dataset. This process can reduce the amount of noise in the dataset from transient outages on the Internet.

Illustrative Methods of a Scanning Engine with Multiple Perspectives

Figure 9:
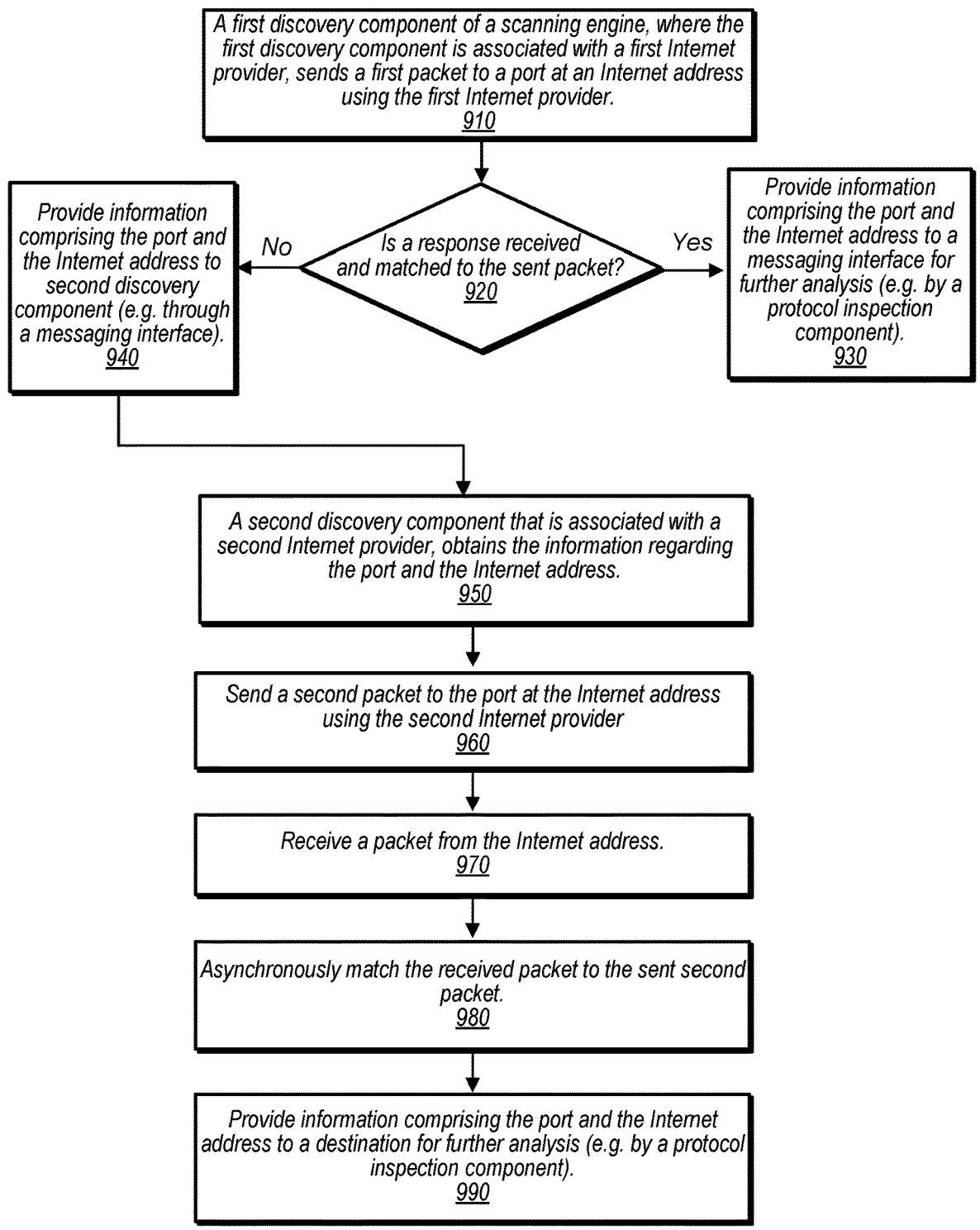
FIG. 9 is a flowchart of an illustrative method that can be implemented by two different perspectives of a scanning engine with multiple perspectives, according to some embodiments, where a first discovery component corresponding to a first perspective that is associated with a first Internet provider sends a packet to a port at an Internet address using the first Internet provider, where if a response is not received to the sent packet, that first discovery component provides information comprising the port and Internet address to a second discovery component corresponding to a second perspective that is associated with a second Internet address, where that second discovery component sends a second packet to the port at the Internet address, receives a packet back from the Internet address, asynchronously matches the received packet to the sent packet, and provides information about the port and Internet address to a destination (e.g. a messaging interface) for further analysis (e.g. by a protocol inspection component), according to some embodiments.

FIG. 9 is a flowchart of an illustrative method that can be implemented by two different perspectives of a scanning engine with multiple perspectives, according to some embodiments. The flowchart starts at block 910, where a first discovery component corresponding to a first perspective that is associated with a first Internet provider sends a packet to a port at an Internet address using the first Internet provider. The flowchart then transitions to block 920 which determines if a response is received and matched to the sent packet. In some embodiments, the discovery component can be sending out multiple packets to multiple ports at multiple different Internet addresses. The discovery component might include a code in those packets, such that when a response is received with that same code, the discovery component can ensure that the received packet is a response to a packet that it sent. The code can be generated by a formula that might include the port number and/or Internet address and/or an identification for the discovery component as an input. In this way, in some embodiments, the discovery component does not have to keep track of all the packets that it has sent. In addition, because of the cyclic integer multiplication modulo a prime number which generates a new number in a random walk every time it is called (but is guaranteed to be exhaustive and to repeat), the discovery component does not have to keep track of which addresses it has sent packets to, in some embodiments. This allows the discovery component to be more efficient since it does not have to keep track of all that extra state of past actions. In some embodiments, whenever a packet is received, the discovery component can use the code in received packet to determine what port at what Internet address this received packet corresponds to. Once a port at an Internet address is determined, the discovery component then knows that this received packet is a response to a packet sent to that port at that Internet address. Therefore, the discovery component can determine in 920 that a response is received and matched to a particular sent packet.

When a response is received and matched to a particular packet sent to a particular port at a particular Internet address, then the flowchart transitions to block 930. At block 930, the discovery component provides information comprising the particular port and the particular Internet address to a messaging interface for further analysis (e.g. by a protocol inspection component). If, at block 920, no packet has been received that can matched to a particular sent packet, then the flowchart transitions to block 940. The discovery component might wait a certain amount of time (e.g. a timeout period) for a packet to be received and matched, for example. If a response is not received to the sent packet, that first discovery component at block 940 then provides information comprising the port and Internet address to a second discovery component corresponding to a second perspective that is associated with a second Internet address. This providing can occur through a messaging interface, for example. The flowchart then transitions to block 950 where that second discovery component that is associated with the second Internet provider obtains the information regarding the particular port at the particular Internet address. The flowchart transitions to block 960 where that second discovery component sends a second packet to the port at the Internet address, receives a packet back from the Internet address, asynchronously matches the received packet to the sent packet, and provides information about the port and Internet address to a destination (e.g. a messaging interface) for further analysis (e.g. by a protocol inspection component), according to some embodiments.

FIG. 9 is one embodiment for multi-perspectives with regard to the discovery components of a scanning engine. In some embodiments, there can be a cluster or fleet of discovery components, where different discovery components are operating on different dockets, in some embodiments. In addition, this fleet of discovery components can be duplicated across multiple (or even each) of the perspectives as well. The different networks and/or physical locations and/or points of presence and/or data centers from which a discovery component operates can be referred to as different perspectives, depending on the embodiment. In some embodiments, the discovery component(s) can use three different Internet service providers ("ISPs"), such as 3 different Tier 1 ISPs, as three different perspectives. In some embodiments, there can be multiple discovery components that operate on a particular docket in multiple different perspectives. Each of these discovery components can cycle through the particular docket from their particular perspective, where individual entries of the particular docket can include a transport layer port to scan, for example. For each entry, a discovery component can generate a series of network addresses to scan in a pseudorandom fashion (where the series might encompass every address on the Internet, for example). The discovery components for the multiple perspectives that cycle through the same docket (or that at least cycle through dockets that contain some of the same ports) might therefore be simultaneously sending out packets to the same ports at the same Internet addresses. In some embodiments, if responses to the sent packets are received, a discovery component in one perspective might notify the discovery components in another perspective, for example, so that the other discovery components do not send further packets to those successful ports at the successful Internet addresses. In other embodiments, the discovery components from the multiple perspectives, might simply report those ports at the Internet addresses that successfully received a response to the protocol inspection component(s), allowing for the possibility that the same port at the same Internet address might be reported multiple times by multiple perspectives. In such scenarios, these reports (which might be conveyed as messages through a messaging interface to the protocol inspection component(s)) might be de-duplicated by either the protocol inspection component(s), or an intervening component between the discovery component(s) and protocol inspection component(s), such as the messaging interface, depending on the embodiment.

Figure 10:
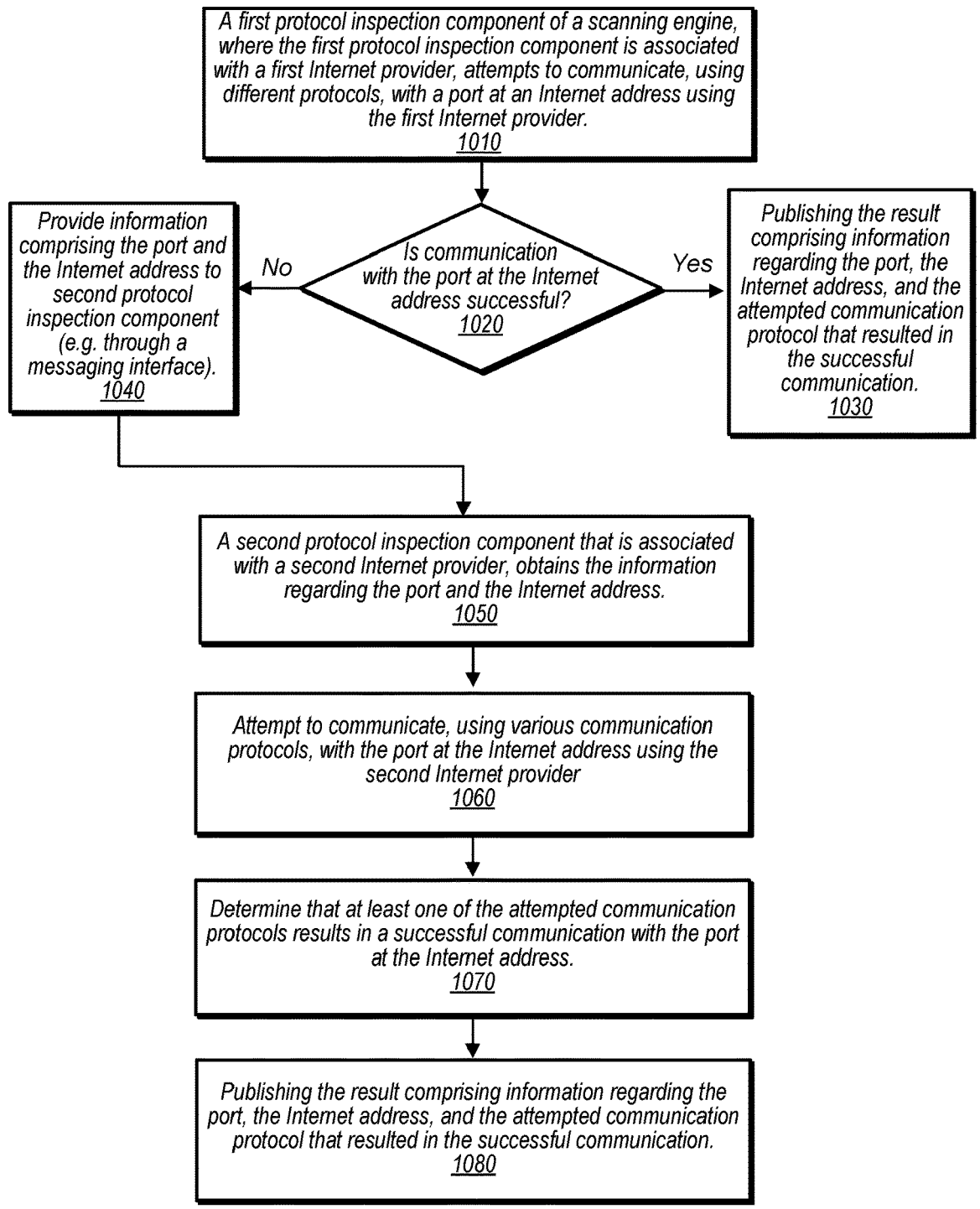
FIG. 10 is a flowchart of an illustrative method that can be implemented by two different perspectives of a scanning engine with multiple perspectives, according to some embodiments, where a first protocol inspection component corresponding to a first perspective that is associated with a first Internet provider attempts to communicate, using different communication protocols, with a port at an Internet address using the first Internet provider, where if communication is not successful, that first protocol inspection component provides information comprising the port and Internet address to a second protocol inspection component corresponding to a second perspective that is associated with a second Internet address, where that second protocol inspection component obtains the information, attempts to communicate, using various protocols, with the port at the Internet address, determines that ate least one of the attempted protocols resulted in a successful communication, and publishes a result regarding the port, the Internet address, and the successful communication protocol, according to some embodiments.

FIG. 10 is a flowchart of an illustrative method that can be implemented by two different perspectives of a scanning engine with multiple perspectives, according to some embodiments. The flowchart starts at block 1010, where a first protocol inspection component corresponding to a first perspective that is associated with a first Internet provider attempts to communicate, using different communication protocols, with a port at an Internet address using the first Internet provider. The flowchart transitions to block 1020 which asks whether the communication with the port at the Internet address was successful. If the communication was successful, then the flowchart transitions to block 1030 which publishes the result comprising information regarding the port, the Internet address, and the attempted communication protocol that resulted in the successful communication. This publishing can be to a datastore of the network, in some embodiments. It can also be to a client or requestor in some embodiments.

If communication attempt is not successful in block 1020, then that first protocol inspection component provides information comprising the port and Internet address to a second protocol inspection component corresponding to a second perspective that is associated with a second Internet address in block 1040. That providing of information can use a messaging interface such as a messaging queue, in some embodiments. The flowchart then transitions to block 1050 where that second protocol inspection component, that is associated with the second Internet provider, obtains the information regarding the port and the Internet address. The flowchart then transitions to block 1060 where the second protocol inspection component corresponding to the second perspective attempts to communicate, using various protocols, with the port at the Internet address using the second Internet provider. This perspective might have a successful communication with the intended destination, in some embodiments. To describe those embodiments, the flowchart transitions to block 1070 where the second protocol inspection component determines that at least one of the attempted protocols resulted in a successful communication with the port at the Internet address. The flowchart finishes at block 1080 which publishes a result comprising information regarding the port, the Internet address, and the attempted communication protocol that resulted in the successful communication, according to some embodiments. This publishing can be to a datastore of the network, in some embodiments. It can also be to a client or requestor in some embodiments.

Figure 11:
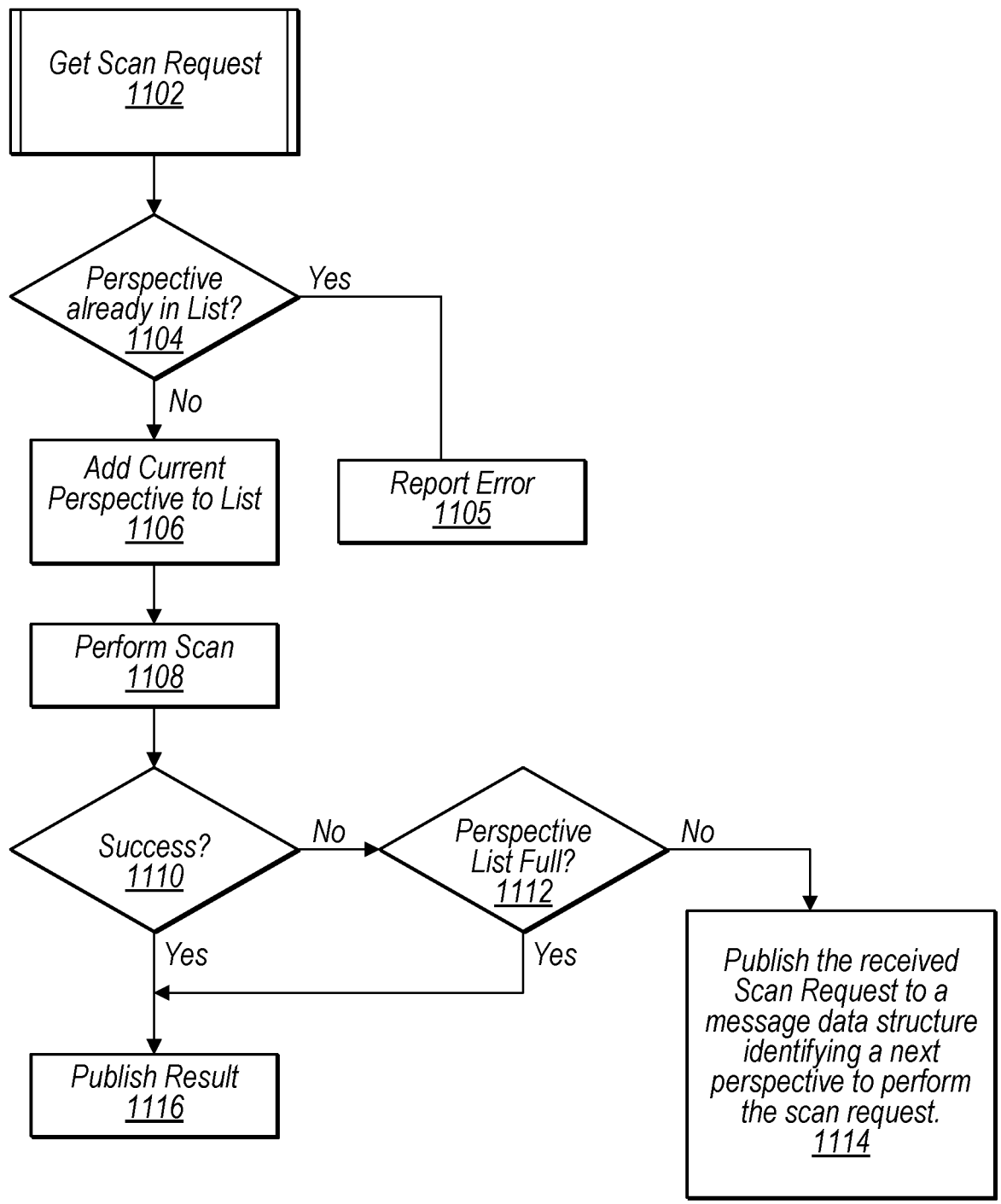
FIG. 11 is a flowchart of an illustrative method that can be implemented by one perspective of a protocol inspection component of a scanning engine with multiple perspectives, according to some embodiments, where when the perspective does not succeed in performing in establishing communication with a target that was requested to be scanned, the perspective publishes the scan request to a message data structure for the next perspective to perform the scan request.

FIG. 11 is a flowchart of an illustrative method that can be implemented by one perspective of a protocol inspection component of a continuous scanning engine with automatic protocol detection, according to some embodiments, where when the perspective does not succeed in performing in establishing communication with a target that was requested to be scanned, the perspective publishes the scan request to a message data structure for the next perspective to perform the scan request.

The flowchart in FIG. 11 begins with getting a scan request (1102). This scan request can be received from a message queue, in some embodiments. The message queue can have individually packaged scan requests, in some embodiments. The input to the message queue can be from a discovery component. The input to the message queue might also be from a protocol inspection component, in some embodiments, when that protocol inspection component republishes a scan, for example. If, for example, a protocol inspection component was not able to communicate with the object of a refresh scan request, then that protocol inspection component can republish the scan request to a message queue for another perspective. The input to the message queue might also be from a host model worldview, which can pass-through a scan request from a client or from mapping software, for example.

There can be a dedicated message queue for each perspective, and then a global message queue, in some embodiments. In addition, each scan request in a message queue can contain a list of perspectives that have already been scanned for that scan request. Therefore, no matter which message queue a scan request is taken from, the perspective implementing this method can check to see if itself is already in the list of perspectives that have been scanned (1104). If the current perspective is in the list, then that means that the scan has already occurred, and so this perspective can report an error (1105) or can simply end the processing of this scan request without reporting an error.

The list of perspectives, in some embodiments, might not be associated with one particular scan request, but might be associated with multiple scan requests, or even all scan request. The list of perspectives might be global, in some embodiments. In addition, instead of being passed in a message queue with scan requests, the list of perspectives can be at a shared known location that is accessible by multiple perspectives. The list of perspectives might be controlled by a component that harnesses information from each of the perspectives and compiles it into a list of perspectives, in some embodiments. The list of perspectives can contain the perspectives that have already attempted to communicate with the object of a scan request (such at the port at an IP address), or a list of the perspectives that have not yet attempted to communicate with the object of a scan request, depending on the embodiments. The list of perspectives might have multiple entries for multiple scan requests, where for each scan request there is a separate list of perspectives associated with that scan request, in some embodiments.

If the current perspective is not in the list at decision 1104, then the method can add the current perspective to the list (1106), and can perform the scan (1108). If the scan is successful at decision block 1110, the result can be published (1116). If the scan was not successful at decision block 1110, then the method checks to see if the perspective list is full at 1112. If the perspective list is full in 1112, this means that all the perspectives have already processed this scan request, and all have been unsuccessful in establishing a communication with the target of the scan request. Therefore, the "Yes" track traverses to block 1116, where the unsuccessful result is published. If, however, the perspective list is not full ("No" track from 1112) this means that not all perspectives have processed the scan request. If there are other perspectives left to scan, then the method publishes the scan request to the next perspective, sending the packaged scan request to another dedicated message queue.

In some embodiments, when all the perspectives have performed unsuccessful scans for a particular scan request, then the target of that scan request is removed from any dataset of the world view of the network. However, in other embodiments there might be a minimum number of times for the process to repeat before any target is pruned from the worldview. Of course, discovery by the discovery component(s) is always still happening, in some embodiments. So even if a target is removed in the refresh process by the protocol inspection component(s), if a discovery component(s) finds the target service again, then the protocol inspection component(s) can rescan the target service, and it can get readded to the worldview, in some embodiments.

The rate at which messages are processed from the message queue can be a function of the resource sizing of the scan engine, in some embodiments. The scan engine will usually process scan requests as fast as the scan resources will allow, in some embodiments. However, in some embodiments, the ledger system can prioritize some scans over other scans. For example, there are some scans that are more resource intensive than other scans. The ledger system can provide a weighting for each one of the different scan modules for each one of the supported communication protocols. In addition, there can be a dynamic worker system, where the workers are created and run when they are needed, in some embodiments. However, in some embodiments, there is a maximum limit of the number of workers that can run simultaneously. The ledger's weighting, therefore, can determine how many workers a particular scan requires from the dynamic worker pool. If there are not enough workers left to allocate, then a particular scan request can block until there are enough workers that it can use to scan. This can be similar to a token-bucket algorithm, in some embodiments.

Figure 12:
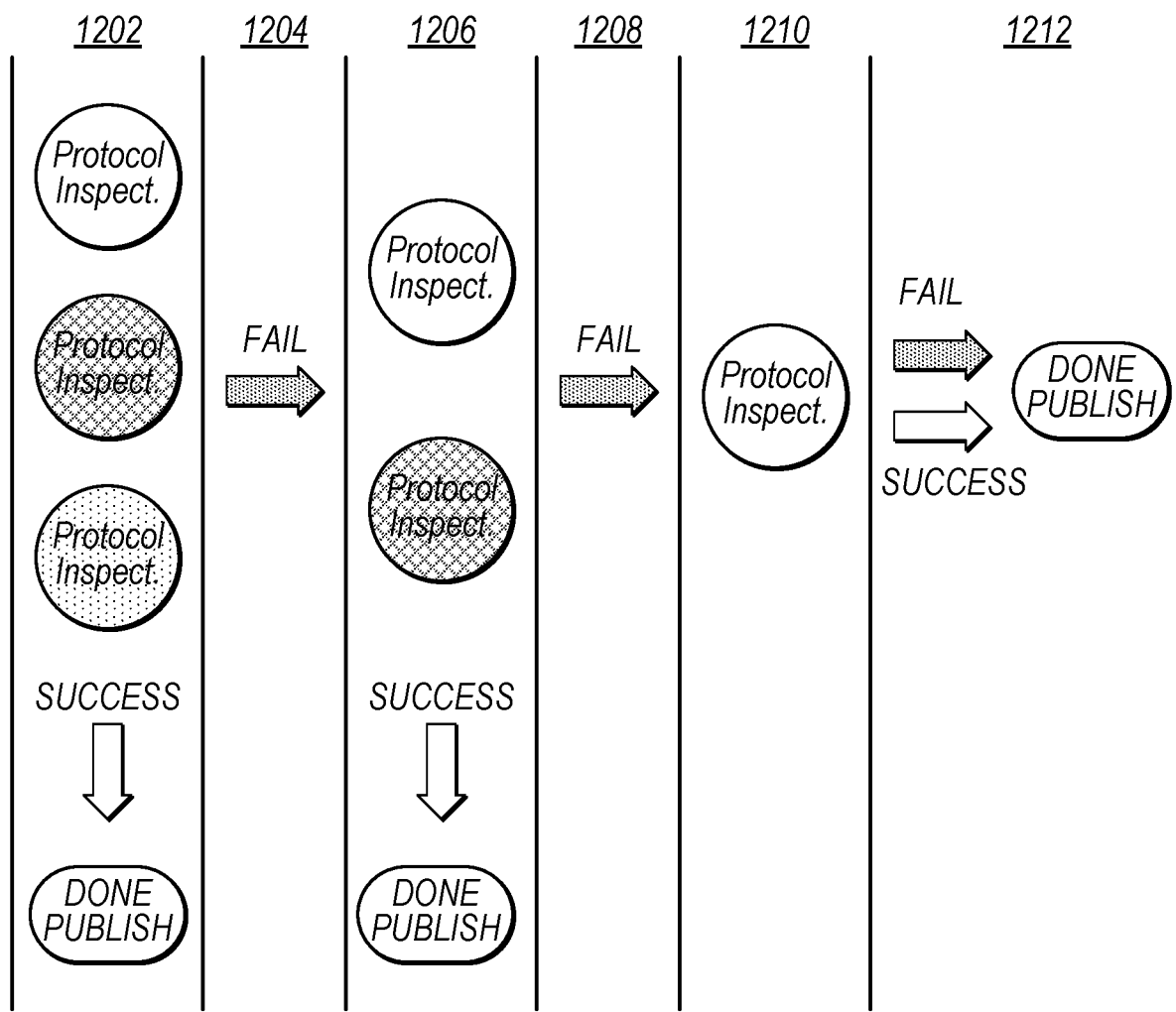
FIG. 12 is a simplified flow diagram showing multiple protocol inspection component perspectives operating on a scan request sequentially, where if one perspective succeeds in scanning the target, the results are published and the scan is finished, and if one perspective fails in scanning the target another remaining perspective attempts to scan the target, according to some embodiments.

FIG. 12 is a simplified flow diagram showing multiple protocol inspection component perspectives operating on a scan request sequentially, where if one perspective succeeds in scanning the target, the results are published and the scan is finished, and if one perspective fails in scanning the target another remaining perspective attempts to scan the target, according to some embodiments.

The flow diagram begins at 1202, where the bottom protocol inspection perspective determines if it can successfully scan a target of a scan request. If it can successfully scan the target, denoted by the "SUCCESS" arrow, then the protocol inspection perspective publishes the result, and the flowchart is done. If, however, the bottom protocol inspection component fails to successfully scan the target ("FAIL" at 1204), then the next protocol inspection perspective will determine if it can successfully scan the target of the scan request at 1206. If the bottom protocol inspection perspective at 1206 can successfully scan the target of the scan request, denoted by the "SUCCESS" arrow at 1206, then the protocol inspection perspective publishes the result, and the flowchart is done. If, however, the bottom protocol inspection component at 1206 fails to successfully scan the target ("FAIL" at 1208), then the next protocol inspection perspective will determine if it can successfully scan the target of the scan request at 1210. This is the last protocol inspection perspective. No matter if this protocol inspection perspective succeeds or fails (denoted by "SUCCESS" or "FAIL" in 1212), the results are published and the flowchart is done.

Illustrative System

Figure 13:
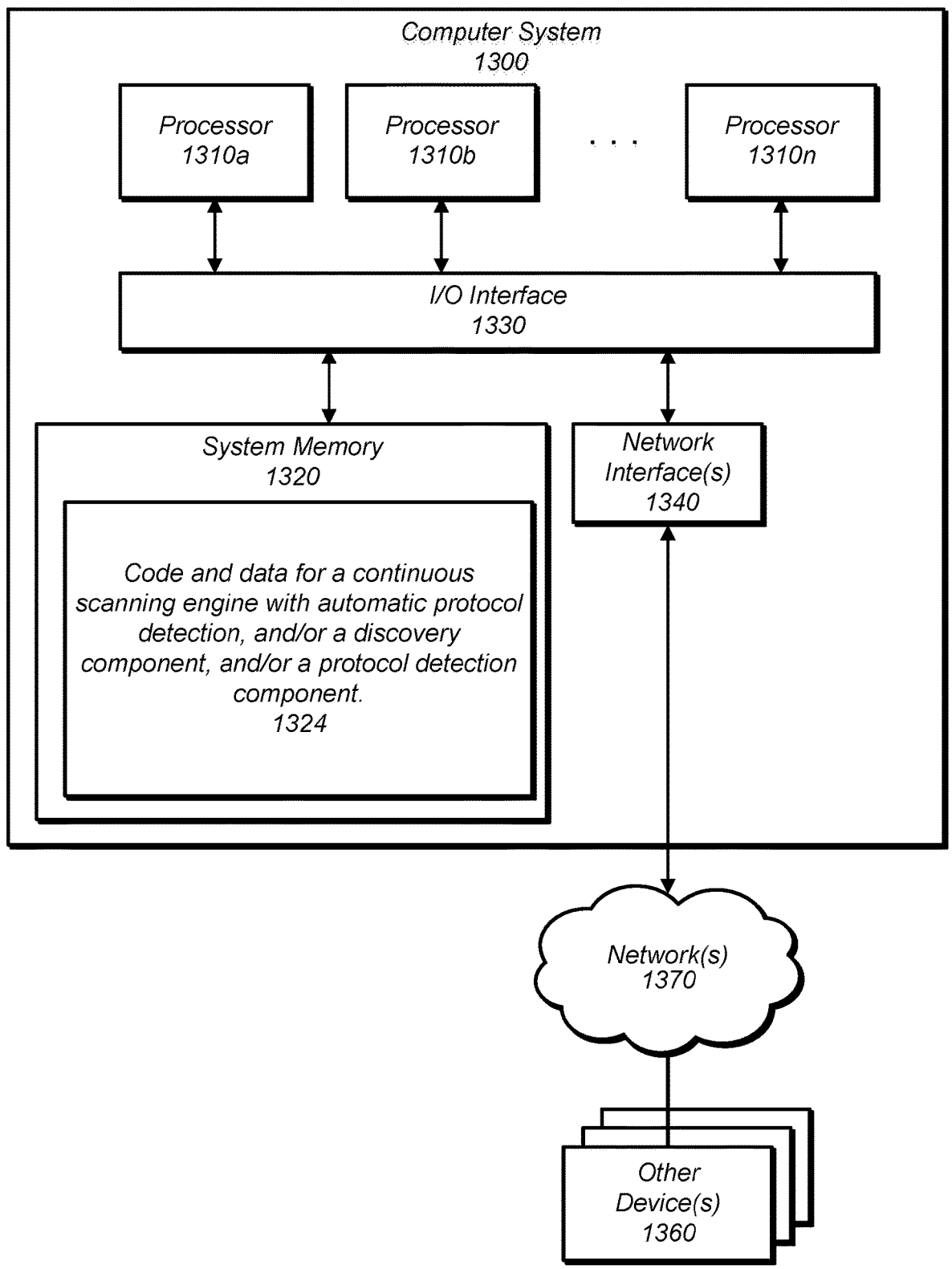
FIG. 13 is a block diagram illustrating an example computer system that may be used for a continuous scanning engine with automatic protocol detection, and/or a discovery component, and/or a protocol detection component, according to some embodiments.

FIG. 13 is a block diagram illustrating an example computer system that may be used for a continuous scanning engine with automatic protocol detection, and/or a discovery component, and/or a protocol detection component, according to some embodiments. In at least some embodiments, a computer that implements a portion or all of the methods and apparatus for a continuous scanning engine with automatic protocol detection, and/or a discovery component, and/or a protocol detection component as described herein may include a general-purpose computer system or computing device that includes or is configured to access one or more computer-accessible media, such as computer system 1300 illustrated in FIG. 13. FIG. 13 is a block diagram illustrating an example computer system that may be used in some embodiments. This computer system can be used as a continuous scanning engine with automatic protocol detection 100, and/or a discovery component 110, and/or a protocol detection component 120, and/or a database of a network 130, and/or scan gates 218, and/or streaming dats structure 512, and/or external controller and datastore 504, and/or subcomponents of the discovery component 310 such as permute 312, blacklist 314, probe component 316, docket 318, sender 320, receiver 322, or reporter 324, and/or subcomponents of the protocol inspection component 420 such as config 422, datapath 424, control 426, publish 428, sender 430, inspect 432, filter 434, worker 438, ledger 420, scan modules 450, and automatic protocol detection 460. In the illustrated embodiment, computer system 1300 includes one or more processors 1310 coupled to a system memory 1320 via an input/output (I/O) interface 1330. Computer system 1300 further includes a network interface 1340 coupled to I/O interface 1330.

In various embodiments, computer system 1300 may be a uniprocessor system including one processor 1310, or a multiprocessor system including several processors 1310 (e.g., two, four, eight, or another suitable number). Processors 1310 may be any suitable processors capable of executing instructions. For example, in various embodiments, processors 1310 may be general-purpose or embedded processors implementing any of a variety of instruction set architectures (ISAs), such as the x86, PowerPC, SPARC, or MIPS ISAs, or any other suitable ISA. In multiprocessor systems, each of processors 1310 may commonly, but not necessarily, implement the same ISA.

System memory 1320 may be configured to store instructions and data accessible by processor(s) 1310. In various embodiments, system memory 1320 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for an apparatus and method of a continuous scanning engine with automatic protocol detection, and/or a discovery component, and/or a protocol detection component, are shown stored within system memory 1320 as the code and data for a continuous scanning engine with automatic protocol detection, and/or a discovery component, and/or a protocol detection component 1324.

In one embodiment, I/O interface 1330 may be configured to coordinate I/O traffic between processor 1310, system memory 1320, and any peripheral devices in the device, including network interface 1340 or other peripheral interfaces. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments some or all of the functionality of I/O interface 1330, such as an interface to system memory 1320, may be incorporated directly into processor 1310.

Network interface 1340 may be configured to allow data to be exchanged between computer system 1300 and other devices 1360 attached to a network or networks 1370, such as other computer systems or devices as illustrated in FIGS. 1-6, for example. In various embodiments, network interface 1340 may support communication via any suitable wired or wireless general data networks, such as types of Ethernet network, for example. Additionally, network interface 1340 may support communication via telecommunications/telephony networks such as analog voice networks or digital fiber communications networks, via storage area networks such as Fibre Channel SANs, or via any other suitable type of network and/or protocol.

In some embodiments, system memory 1320 may be one embodiment of a computer-accessible medium configured to store program instructions and data as described above for FIGS. 1 through 10 for implementing a continuous scanning engine with automatic protocol detection, and/or a discovery component, and/or a protocol detection component. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1300 via I/O interface 1330. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 1300 as system memory 1320 or another type of memory. Further, a computer-accessible medium may include transmission media or signals such as electrical, electromagnetic, or digital signals, conveyed via a communication medium such as a network and/or a wireless link, such as may be implemented via network interface 1340.

Any of various computer systems may be configured to implement processes associated with a provider network, the continuous scanning engine with automatic protocol detection, the discovery component, the protocol detection component, or any other component of the above figures. In various embodiments, a provider network, the continuous scanning engine with automatic protocol detection, the discovery component(s), the protocol detection component(s), or any other component of any of FIGS. 1-12 may each include one or more computer systems 1300 such as that illustrated in FIG. 13. In embodiments, a provider network, the continuous scanning engine with automatic protocol detection, the discovery component(s), the protocol detection component(s), or any other component may include one or more components of the computer system 1300 that function in a same or similar way as described for the computer system 1300.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
    performing, by one or more computer devices:
        storing weights for different types of protocol scans;
        receiving a list of port numbers associated with different network addresses; and
        performing an automatic protocol detection on individual ports on the list, including:
            selecting, based at least in part on the weights, a plurality of application-layer protocols to use to attempt communication with a port;
            attempting communication with the port using the plurality of application-layer protocols;
            detecting that one of the plurality of application-layer protocols resulted in a successful communication with a service executing the one of the plurality of application-layer protocols on the port as a detected application-layer protocol from among the plurality of application-layer protocols;
            conducting further communication with the service on the port according to the detected application-layer protocol to elicit service information about the service; and
            storing an inspection record in a database, wherein the inspection record indicates the port, a network address of the port, the detected application-layer protocol that was detected from among the plurality of application-layer protocols, and the service information elicited about the service.

2. The method of claim 1, wherein the plurality of application-layer protocols is selected based at least in part on response data of the port received in response to a previous probe of the port.

3. The method of claim 2, wherein the plurality of application-layer protocols is selected based at least in part on a probabilistic match of the response data against a set of application-layer protocols.

4. The method of claim 3, wherein the set application-layer protocols includes two or more of SSH, HTTP, HTTPS, and RDP.

5. The method of claim 3, wherein the application-layer protocol detected on the port employs Transport Layer Security (TLS) protocol, and the service information comprises TLS configuration aspects of the service.

6. The method of claim 1, wherein the service information is determined from a transcript of requests and responses in the further communication with the service.

7. The method of claim 6, further comprising labelling elements in the transcript with descriptive labels to generate the inspection record.

8. The method of claim 1, wherein the application-layer protocol detected on the port comprises HTTP or HTTPS, and the service information comprises a type and version of a web server software executing on the port.

9. The method of claim 1, further comprising:
    sending a notification to a remote network indicating detection of the application-layer protocol on the port.

10. The method of claim 1, further comprising:
    performing a refresh of the inspection record, wherein the refresh includes attempting another communication with the port using the application-layer communication protocol indicated in the inspection record to determine whether the service is still present on the port and whether the service has changed.

11. A system, comprising:
one or more computer devices that implement an automatic protocol detection system, configured to:
maintain weights for different types of protocol scans;
receive a list of port numbers associated with different network addresses; and
perform an automatic protocol detection on individual ports on the list, including to:
select, based at least in part on the weights, a plurality of application-layer protocols to use to attempt communication with a port;
attempt communication with the port using the plurality of application-layer protocols;
detect that one of the plurality of application-layer protocols resulted in a successful communication with a service executing the one of the plurality of application-layer protocols on the port as a detected application-layer protocol from among the plurality of application-layer protocols;
conduct further communication with the service on the port according to the detected application-layer protocol to elicit service information about the service; and
output an inspection record, wherein the inspection record indicates the port, a network address of the port, the detected application-layer protocol that was detected from among the plurality of application-layer protocols, and the service information elicited about the service.

12. The system of claim 11, wherein the plurality of application-layer protocols is selected based at least in part on a probabilistic match of the response data against a set of application-layer protocols.

13. The system of claim 11, wherein the set application-layer protocols includes two or more of SSH, HTTP, HTTPS, and RDP.

14. The system of claim 11, wherein the automatic protocol detection system is configured to attempt communication with the port from clients connected via multiple Internet service providers.

15. The system of claim 11, further comprising a discovery system implemented by one or more computer devices, wherein the list of port numbers includes open ports discovered by the discovery system based on a scan of Internet network addresses.

16. The system of claim 15, wherein the list of port numbers is received from the discovery system via a message queue implemented between the discovery system and the automatic protocol detection system.

17. The system of claim 11, wherein the automatic protocol detection system implements a worker pool to perform port scans, wherein the worker pool dynamically scales up or down a number of worker nodes based at least in part on scan load.

18. The system of claim 11, wherein the weights for the different types of protocol scans are determined based at least in part on respective resources needed to perform the different types of protocol scan.

19. The system of claim 11, further comprising a scan gate component, wherein the scan gate component maintains scan counts for individual ports and is used by the automatic protocol detection system to limit duplicate scans of the individual ports.

* * * * *